United States Patent
Sasaki

(10) Patent No.: US 7,674,968 B2
(45) Date of Patent: Mar. 9, 2010

(54) MUSICAL INSTRUMENT WITH ELECTRONIC PROOF SYSTEM, ELECTRIC SYSTEM AND COMPUTER PROGRAM

(75) Inventor: Tsutomu Sasaki, Hamamatsu (JP)

(73) Assignee: Yamaha Corporation, Shizuoka-Ken (JP)

( * ) Notice: Subject to any disclaimer, the term of this patent is extended or adjusted under 35 U.S.C. 154(b) by 0 days.

(21) Appl. No.: 12/034,680

(22) Filed: Feb. 21, 2008

(65) Prior Publication Data
US 2008/0229908 A1 Sep. 25, 2008

(30) Foreign Application Priority Data
Mar. 23, 2007 (JP) ............... 2007-077109

(51) Int. Cl.
G10H 1/18 (2006.01)
G10H 1/32 (2006.01)

(52) U.S. Cl. ......................... 84/615; 84/653

(58) Field of Classification Search ............... 84/600, 84/601, 609, 615, 616, 649, 653
See application file for complete search history.

(56) References Cited

U.S. PATENT DOCUMENTS

| | | | | |
|---|---|---|---|---|
| 4,581,491 | A * | 4/1986 | Boothroyd | 607/118 |
| 5,189,242 | A * | 2/1993 | Usa | 84/743 |
| 5,742,141 | A * | 4/1998 | Czekaj | 318/587 |
| 6,162,975 | A * | 12/2000 | Purdue | 84/395 |
| 6,380,472 | B1 | 4/2002 | Sugiyama et al. | |
| 6,703,550 | B2 * | 3/2004 | Chu | 84/609 |
| 7,112,737 | B2 * | 9/2006 | Ramstein | 84/645 |
| 7,208,671 | B2 * | 4/2007 | Chu | 84/609 |
| 7,425,675 | B2 * | 9/2008 | Chu | 84/645 |
| 2001/0032538 | A1 * | 10/2001 | Koch | 84/477 R |
| 2003/0068053 | A1 * | 4/2003 | Chu | 381/118 |
| 2004/0064787 | A1 * | 4/2004 | Braun et al. | 715/505 |
| 2005/0145100 | A1 * | 7/2005 | Ramstein | 84/645 |
| 2005/0237305 | A1 * | 10/2005 | Klein | 345/168 |
| 2006/0022833 | A1 * | 2/2006 | Ferguson et al. | 340/573.1 |
| 2006/0278065 | A1 * | 12/2006 | Ramstein | 84/645 |
| 2007/0193436 | A1 * | 8/2007 | Chu | 84/609 |
| 2008/0083314 | A1 * | 4/2008 | Hayashi et al. | 84/22 |
| 2008/0134861 | A1 * | 6/2008 | Pearson | 84/470 R |
| 2008/0271585 | A1 * | 11/2008 | Jones | 84/281 |
| 2008/0302233 | A1 * | 12/2008 | Ding et al. | 84/609 |

(Continued)

FOREIGN PATENT DOCUMENTS

CN 1838227 9/2006

(Continued)

Primary Examiner—David S. Warren
(74) Attorney, Agent, or Firm—Harness, Dickey & Pierce, PLC

(57) ABSTRACT

An automatic player musical instrument is a combination of an acoustic piano and an electric system, which serves as an automatic playing system and an electronic proof system, and a controller of the electric system has an information processing capability; when a user instructs the electric system to check performance on the keyboard, a subroutine program for electronic proof starts to run; while the user is fingering a music tune, the controller monitors the keys with key sensors to see whether or not the user correctly plays the music tune; when the user mistakenly depresses a key instead of another key, the controller gives rise to vibrations of the mistakenly de-pressed key so as to give a notice of incorrect fingering to the user.

17 Claims, 14 Drawing Sheets

U.S. PATENT DOCUMENTS

2009/0000403 A1* 1/2009 Magnussen et al. ...... 73/864.18
2009/0013857 A1* 1/2009 Ramstein ..................... 84/645

FOREIGN PATENT DOCUMENTS

| | | |
|---|---|---|
| JP | 06-067653 | 3/1994 |
| JP | 08-076750 | 3/1996 |
| JP | 2000-194356 | 7/2000 |
| JP | 2000/298477 | 10/2000 |

* cited by examiner

MUSICAL INSTRUMENT WITH ELECTRONIC PROOF SYSTEM, ELECTRIC SYSTEM AND COMPUTER PROGRAM

FIELD OF THE INVENTION

This invention relates to a musical instrument and, more particularly, to a musical instrument with an electronic proof system for music students, an electric system serving as the electronic proof system and a computer program running on an information processor of the electric system.

DESCRIPTION OF THE RELATED ART

It is not easy to make progress in musical instruments. There have been proposed various assisting device and various assisting system for music students. An electronic assisting system is adapted to guide a music student in their fingering on an acoustic piano by slightly sinking the black keys and white keys of a keyboard musical instrument immediately before the music student is to depress the black keys and white keys. A typical example of the electronic assisting system is disclosed in Japan Patent Application laid-open No. 2000-194356. The prior art electronic assisting system includes a controller and solenoid-operated key actuators. The solenoid-operated key actuators are respectively provided for the black keys and white keys of the keyboard musical instrument, and the controller processes music data codes expressing the black keys and white keys to be depressed along a music tune and time to depress the black keys and white keys. While the music student is practicing the fingering on the keyboard musical instrument, the controller selectively energizes the solenoid-operated key actuators immediately before the music student is to depress the black keys and white keys, and makes the music student take notice of the black keys and white keys to be depressed.

Another example of the electronic assisting system is disclosed in Japan Patent Application laid-open No. Hei 8-76750. The prior art electronic assisting system makes a music student take notice of the finger positions for the hands on the keyboard. The prior art electronic assisting system includes a controller and an array of light emitting devices or key actuators. When a music student is to change the finger positions, the controller energizes the light emitting devices associated with the black keys and white keys to be depressed by the fingers. Otherwise, the controller makes the black keys and white keys to be depressed slightly sunk by means of the key actuators.

The above-described electronic assisting systems aim at guidance in fingering for the music students. Music students, who can not read music scores, may appreciate the prior art electronic assisting systems. However, middlebrows may not feel the prior art electronic assisting systems less necessary. The middlebrows may wish to cure weak points in fingering. An electronic proof system is proposed for their wishes.

A typical example of the electronic proof system is disclosed in Japan Patent Application laid-open No. Hei 6-67653. The prior art electronic proof system is provided for electronic keyboards with built-in effectors. The prior art electronic proof system monitors the black keys and white keys of electronic keyboards to see whether or not a player mistakenly depresses a black key or a white key instead of the key to be depressed. When the player mistakenly depresses a key, the prior art electronic proof system imparts an effect to the electronic tone so as to notify the player of the incorrect fingering.

However, a problem is encountered in the prior art electronic proof system in that the application of prior art electronic proof system is limited to the electronic keyboards with built-in effectors.

Another problem is that the player feels the notice through the addition of effect to the tone less discriminative in the performance of chords. Although the effect is imparted to the incorrect tone, the incorrect tone is mixed with other tones through the mixer, and those tones are concurrently produced. If the player has an exact ear for the pitch of tones, he or she can recognize the incorrect tone. However, if not, he or she feels it difficult to determine what tone is incorrect.

SUMMARY OF THE INVENTION

It is therefore an important object of the present invention to provide a musical instrument, an electronic proof system of which makes it possible to notify a player of incorrect fingering through an easily discriminative notification.

It is another important object of the present invention to provide an electric system, which serves as the electronic proof system.

It is also an important object of the present invention to provide an information storage medium, in which a computer program is stored for the electric system.

In accordance with one aspect of the present invention, there is provided a musical instrument for producing tones, and the musical instrument comprises plural manipulators selectively depressed by a human player for specifying an attribute of the tones in a performance of a music tune, a tone generator connected to the plural manipulators and producing the tones having the specified attribute, a sensor unit provided in association with the plural manipulators and producing a detecting signal representative of the depressed manipulators, plural messengers respectively associated with the plural manipulators and bringing the human player a notice of mistakenly depressed manipulator through a sense of the human player except for the auditory sense and a controller connected to the sensor unit and the plural messengers, supplied with pieces of music data expressing at least the attribute of tones to be produced in the performance of the music tune and comparing the attribute of tones expressed by the pieces of music data with the attribute of tones specified by the depressed manipulators to see whether or not the human player correctly depresses the manipulators in the performance of the music tune so as to make the messengers associated with the mistakenly depressed manipulators bring the human player the notice of mistakenly depressed manipulator when the comparison results in inconsistence.

In accordance with another aspect of the present invention, there is provided an electric system for an electronic proof on a performance of a music tune on a musical instrument, and the electric system comprises a sensor unit provided in association with plural manipulators of the musical instrument and producing a detecting signal representative of the depressed manipulators, plural messengers respectively associated with the plural manipulators and bringing a human player a notice of mistakenly depressed manipulator through a sense of the human player except for the auditory sense and a controller connected to the sensor unit and the plural messengers, supplied with pieces of music data expressing at least the attribute of tones to be produced in the performance of the music tune and comparing the attribute of tones expressed by the pieces of music data with the attribute of tones specified by the depressed manipulators to see whether or not the human player correctly depresses the manipulators in the performance of the music tune so as to make the messengers associated with the mistakenly depressed manipulators bring the human player the notice of mistakenly depressed manipulator when the comparison results in inconsistence.

In accordance with yet another aspect of the present invention, there is provided an information storage medium for storing a computer program expressing a method for an electronic proof, and the method comprises the steps of a) determining a manipulator of a musical instrument depressed by a human player in a performance of a music tune, b) comparing an attribute of tone specified by the depressed manipulator with the attribute of tone expressed by a piece of music data to see whether or not the human player correctly depresses the manipulator, c) producing a notice of mistakenly depressed manipulator when the comparison at the step c) results in a negative answer, d) bringing the human player the notice of mistakenly depressed manipulator by means of a messenger associated with the mistakenly depressed key through a sense of the human player except for the auditory sense, e) prohibiting the messenger from brining the human player the notice when the comparison results in a positive answer without execution at the steps d) and e) and f) repeating the steps a) to e) for other tones in the music tune.

BRIEF DESCRIPTION OF THE DRAWINGS

The features and advantages of the musical instrument, controller and computer program will be more clearly understood from the following description taken in conjunction with the accompanying drawings, in which.

DESCRIPTION OF THE PREFERRED EMBODIMENTS

A musical instrument embodying the present invention comprises plural manipulators, a tone generator, a sensor unit, plural messengers and a controller. A human player selectively depresses the plural manipulator in a performance of a music tune so as to specify an attribute of the tones to be produced. The tone generator is connected to the plural manipulators, and responsive to the manipulators depressed by the human player so as to produce the tones having the specified attribute.

The sensor unit and plural messengers are connected to the controller for electric proof. In detail, the sensor unit is provided in association with the plural manipulators, and produces a detecting signal representative of the depressed manipulators. The detecting signal is supplied to the controller.

The plural messengers are respectively associated with the plural manipulators, and bring the human player a notice of mistakenly depressed manipulator through a sense of the human player except for the auditory sense.

The controller is supplied with pieces of music data expressing at least the attribute of tones to be produced in the performance of the music tune, and compares the attribute of tones expressed by the pieces of music data with the attribute of tones specified by the depressed manipulators to see whether or not the human player correctly depresses the manipulators in the performance of the music tune. When the comparison results in inconsistence, the controller makes the messengers, which are associated with the mistakenly depressed manipulators, bring the human player the notice of mistakenly depressed manipulator.

As will be appreciated from the foregoing description, even if the human player does not have good ears for the pitch of tones, the controller makes the messengers, which are uniquely associated with the mistakenly depressed manipulators, bring the notice of mistakenly depressed manipulator through the sense except for the auditory sense, and, accordingly, the human player easily understand the notice. The sense may be tactile impression and/or visual sensation.

The sensor unit, plural messengers and controller may form an electric system available for retrofitting an acoustic musical instrument to the musical instrument of the present invention. Otherwise, the electric system may be used as a portable electronic proof system. The functions of controller may be defined in a computer program stored in an information storage medium.

In the following description, term "front" is indicative of a position closer to a human player, who is sitting on a stool for fingering, than a position modified with term "rear". "Longitudinal direction" extends in a direction passing through a front position and a corresponding rear position, and "lateral direction" crosses the longitudinal direction at right angle. "Up-and-down direction" is normal to a plane defined by the longitudinal direction and lateral direction.

First Embodiment

Figure 1:
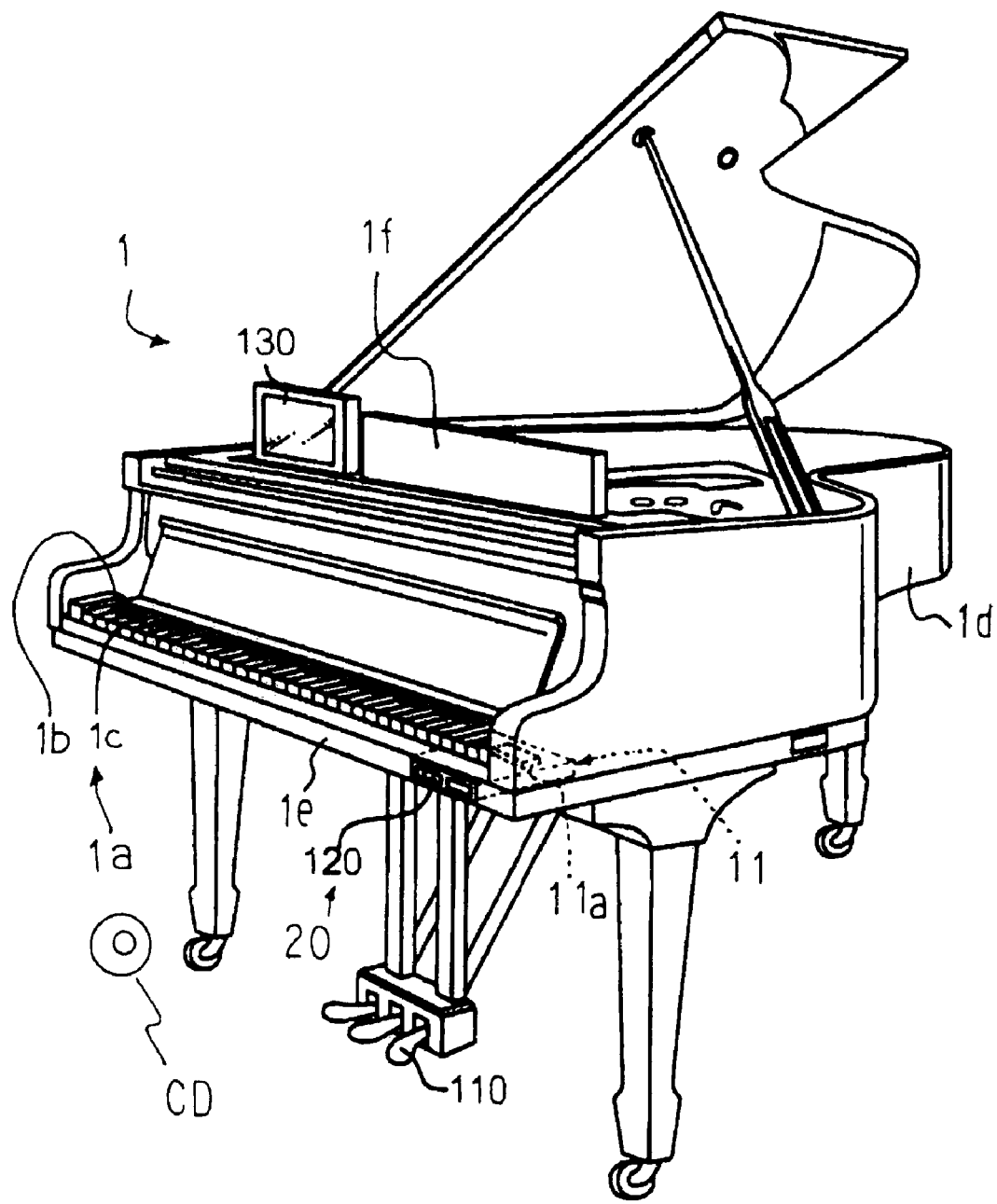
FIG. 1 is a schematic perspective view showing the external appearance of an automatic player musical instrument of the present invention.
Figure 2:
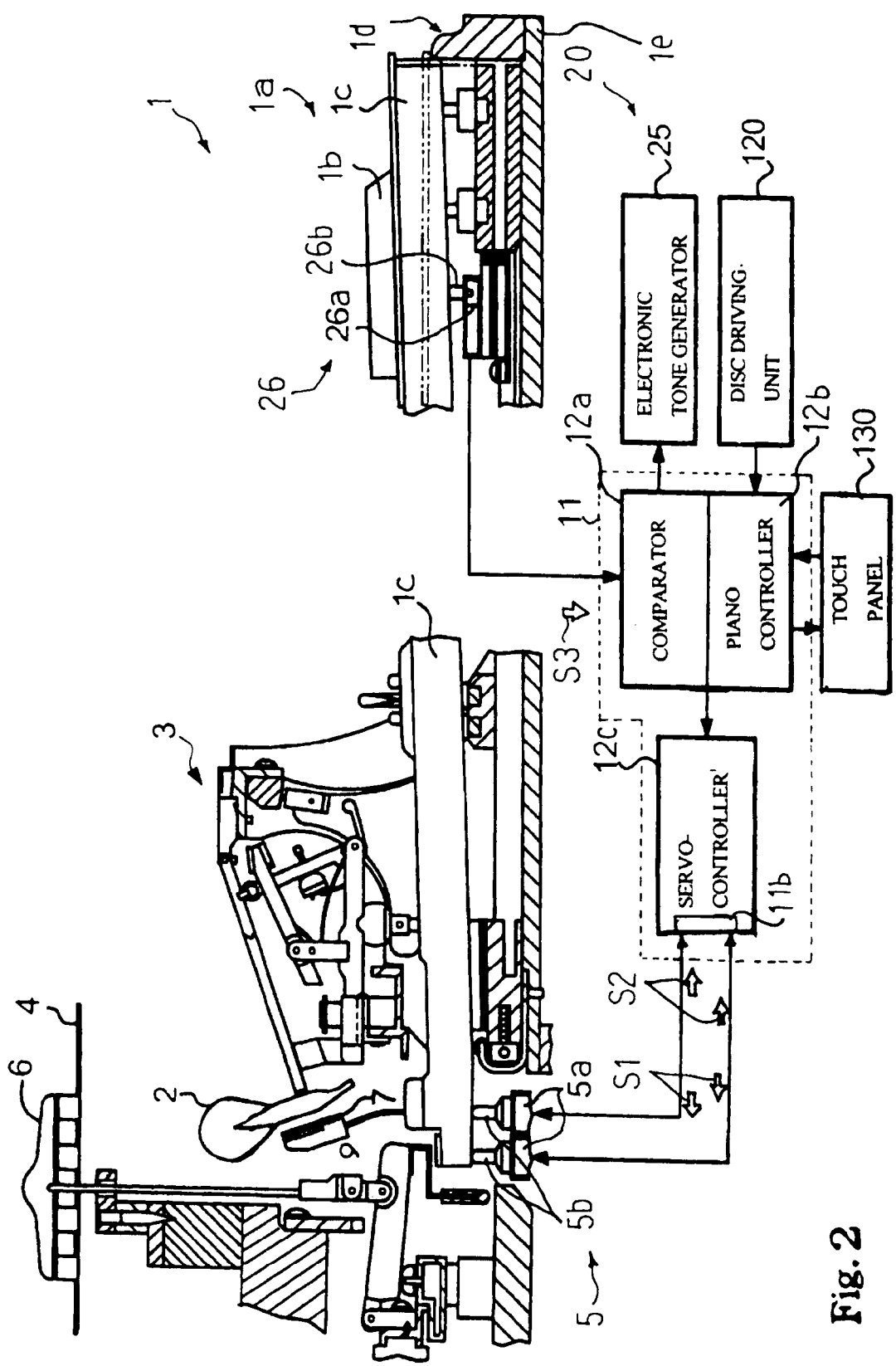
FIG. 2 is a schematic side view showing the structure of automatic player musical instrument.

Referring first to FIGS. 1 and 2 of the drawings, an automatic playing musical instrument embodying the present invention largely comprises an acoustic piano 1, a muting system (not shown) and an electric system 20, and the electric system 20 has information processing capability so as to serve as an automatic playing system and an electronic proof system through execution of sub-routine programs. While the sub-routine program for the automatic playing is running, the electric system 20 serves as the automatic playing system, and the automatic playing system performs a music tune on the acoustic piano 1 without any fingering of a human player. On the other hand, while the sub-routine program for the electronic proof is running, the electric system 20 serves as the electronic proof system, and notifies a human player, who is fingering on the acoustic piano 1, of incorrect fingering. Though not shown in the drawings, the muting system includes a hammer stopper and a driving mechanism for the hammer stopper. While the hammer stopper is being active, the hammer stopper prohibits the acoustic piano 1 from producing acoustic piano tones.

Acoustic Piano

The acoustic piano 1 includes a keyboard 1a, i.e., an array of black keys 1b and white keys 1c, hammers 2, action units 3, strings 4, dampers 6, a pedal mechanism 110 and a piano cabinet 1d. The keyboard 1a is mounted on a key bed 1e, which forms a bottom part of the piano cabinet 1d, and the hammers 2, action units 3, strings 4 and dampers 6 are provided inside the piano cabinet 1d.

The black keys 1b and white keys 1c are arrayed in the lateral direction, and are linked with the action units 3 at the intermediate portions thereof and dampers 6 at the rear portions thereof. While force is being exerted on the front portions of keys 1b and 1c, the black keys 1b and white keys 1c travel from rest positions to end positions along loci, and the black keys 1b and white keys 1c actuate the associated action units 3.

The action units 3 are further linked with the hammers 2, and the hammers 2 are opposed to the strings 4. Thus, the motion of keys 1b and 1c is transmitted from the black keys 1b and white keys 1c through the action units 3 to the hammers 2 so that a human player and the automatic playing system drive the hammers 2 by depressing and releasing the black keys 1b and white keys 1c. A back check 7 forms a part of the action unit 3, and makes the hammers 2 softly landed thereon.

The hammer stopper (not shown) is provided between the hammers 2 and the strings 4. While driving mechanism (not shown) is keeping the hammer stopper outside the loci of keys 1b and 1c, the hammer stopper does not interfere the movements of keys 1b and 1c. However, when a human player moves the hammer stopper onto the loci of keys 1b and 1c by means of the driving mechanism, although the action units 3 make the hammers 2 driving for rotation, the hammers 2 rebound on the hammer stopper before reaching the strings 4. Thus, the muting system prevents the strings 4 from vibrations at the collision with the hammers 2.

The dampers 6 are spaced from and brought into contact with the strings 4 depending upon the key positions on the loci of keys 1b/1c. The pedal mechanism 110 is linked with the keyboard 1a and dampers 6, and the human player and automatic playing system directly change the position of keyboard 1a on the key bed 1e and the position of dampers 6 for artificial expressions.

While all of the black and white keys 1b/1c are staying at the rest positions, the hammers 2 are spaced from the associated strings 4, and the dampers 6 are held in contact with the strings 4 as shown in FIG. 2.

When the human player depresses one of the black and white keys 1b/1c, the depressed key 1b/1c starts to travel on the locus. While the depressed key 1b/1c is traveling on the locus, the depressed key 1b/1c causes the dampers 6 to be spaced from the associated strings 4, and actuates the associated action unit 3. The actuated action unit 3 makes the hammer 2 driven for rotation toward the associated string 4. The hammer 2 is brought into collision with the string 4 at the end of rotation, and gives rise to vibrations of the string 4. The vibrating string 4 in turn gives rise to the vibrations of a sound board, which forms a part of the piano cabinet 1d, and an acoustic piano tone is radiated from the acoustic piano 1. The hammer 2 rebounds on the string 4, and is softly landed on the back check 7.

The loudness of acoustic piano tone is proportional to the velocity of hammer 2 immediately before the collision with the string 4. The human player and automatic playing system strongly depress the black keys 1b and white keys 1c so as to produce the acoustic piano tones at large loudness. On the other hand, the human player and automatic playing system gently depress the black keys 1b and white keys 1c for the acoustic piano tones at small loudness.

When the human player releases the depressed key 1b/1c, the released key 1b/1c starts backwardly to travel on the locus. The released key 1b/1c permits the damper 6 to move toward the string 4, and is brought into contact with the vibrating string 4 so as to decay the vibrations. The released key 1b/1c further permits the action unit 3 to return to the rest position shown in FIG. 2.

When the human player and automatic playing system give the artificial expression to the acoustic piano tones, the human player and automatic playing system depress the pedal of the pedal mechanism 110, and make the acoustic piano tone prolonged or lessened in loudness depending upon the depressed pedal.

Electric System

The electric system 20 includes an array of solenoid-operated key actuators 5, a controller 11, an electronic tone generator 25, an array of key sensors 26, a disc driving unit 120 and a touch panel 130. The controller 11 has an information processing system 11a and pulse width modulators 11b, and a central processing unit, peripheral processors, a program memory, a working memory and various interfaces are incorporated in the information processing system 11a. The information processing system 11a is the origin of the data processing capability. A read only memory and/or an electrically erasable and programmable read only memory is available for the program memory, and a random access memory may serve as the working memory.

A computer program is stored in the program memory together with control parameters, and is broken down into a main routine program and subroutine programs. While the main routine program is running on the central processing unit, human players communicate with the information processing system 11a. The human player gives his or her instructions to the information processing system 11a, and the information processing system 11a lets the human player know current status of the electric system 20. One of the sub-routine programs is prepared for the automatic playing, and another sub-routine program is prepared for the electronic proof. Yet another subroutine program runs on the central processing unit so as to produce music data codes for a muting performance.

When the human player instructs the electric system 20 to perform a music tune without any fingering, the main routine program branches to the subroutine program for the automatic playing. On the other hand, if the human player instructs the electric system 20 to check the keyboard to see whether or not he or she correctly fingers a music tune on the keyboard 1a, the main routine program branches to the sub-routine program for the electronic proof. When the human player instructs the electric system 20 to assist the human player in the muting performance, the central processing unit makes the hammer stopper moved onto the loci of black keys 1b and the loci of white keys 1c. While the human player is fingering on the keyboard 1a, the central processing unit produces the music data codes expressing the tones to be produced and decayed on the basis of pieces of performance data supplied from the key sensors 26, and supplies the music data codes to the electric tone generator for producing and decaying electronic tones.

A comparator 12a, a piano controller 12b and a servo controller 12c express functions of controller 11 realized through the execution of subroutine program for the automatic playing and the execution of subroutine program for the electronic proof, and will be described in conjunction of the behavior of automatic player musical instrument.

The array of solenoid-operated key actuators 5 are provided in association with the keys 1b and 1c, respectively, and are supported by the key bed 1e under the rear portions of black keys 1b and the rear portions of white keys 1c. Each of the solenoid-operated key actuators 5 has a solenoid 5a and a plunger 5b. The solenoids 5a are connected in parallel to the pulse width modulators 11b so that the pulse width modulators 11b selectively supply driving signals S1 to the solenoid. The plungers 5b are projectable from and retractable into the associated solenoids 5a, and the tips of plungers 5b are staying beneath the lower surfaces of keys 1b and 1c while the plungers are retracted in the solenoids 5a. Though not shown in the drawings, built-in plunger sensors monitor the plungers 5b, and supply plunger velocity signals S2 to the controller 11.

While the driving signal S1 is following through the solenoid 5a, magnetic field is created around the plunger 5b, and the magnetic force makes the plunger 5b upwardly project from the solenoid 5a. As a result, the plunger 5b pushes the rear portion of the associated key 1b or 1c, and the black key 1b or white key 1c is depressed without any fingering of a human player. The magnetic force is proportional to the mean current or duty ratio of the driving signal S1, and the information processing system 11a makes the pulse width modulator 11b vary the amount of mean current depending upon the loudness of tone to be produced.

When the driving signal S1 is removed from the solenoid 5a, the weight of key 1b/1c, action unit 3, hammer 2 and damper 6 presses the plunger 5b in the downward direction. For this reason, the plunger 5b is retracted into the associated solenoid 5a.

The array of key sensors 26 is provided under the front portions of black keys 1b and the front portions of white keys 1c. The key sensors 26 are of the type converting the current key position to the amount of photo current. In detail, each of the key sensors 26 has a pair of sensor heads 26a connected to a light emitting diode and a light detecting element and an optical modulator 26b. The sensor heads 26a are provided on both sides of the locus of associated key 1b or 1c, and a light beam is created across the locus. The optical modulator 26b is secured to the associated key 1b or 1c in such a manner as downwardly to project from the lower surface of key 1b or 1c. The transparency of optical modulator 26b is varied from the upper end to the lower end. While the associated black key 1b or white key 1c is traveling on the locus, the light beam passes through the optical modulator 26b, and the optical modulator 26b causes the mount of light passing therethrough to be varied depending on the current key position on the locus. The light detecting element converts the incident light to photo current, and the photo current forms a key position signal S3. The key position signals S3 express the pieces of performance data, and are supplied from the key sensors 26 to the controller 11.

The touch panel 130 is a combination of a liquid crystal display panel and a matrix switch overlapped with the monitor screen of the liquid crystal display panel. The touch panel 130 is provided on the piano cabinet 1d on the left side of a music rack If so that a human player can give his or her instruction to the electric system 20 by pushing areas of the matrix switch over certain visual images produced on the monitor screen of the liquid crystal display panel without standing up. The information processing system 11a produces visual images expressing prompt messages, confirmation messages and current status of the electric system 20 on the touch panel 130. Thus, the touch panel 130 serves as a man-machine interface.

The key bed 1e is partially cut out so as to form a hollow space, and the controller 11 is inserted into the hollow space. The housing of controller 11 has a front panel, which is coplanar with the front surface of the key bed 1e, and the disc driving unit 120 is exposed to the human player, who is sitting on a stool for fingering. For this reason, while a disc tray projects from the front panel of the housing of controller 11, the human player puts an information disc CD such as, for example, a CD (Compact Disc) or a DVD (Digital Versatile Disc) on the disc tray. Thereafter, the human player retracts the disc tray into the housing of controller 11. Plural sets of music data codes express music tunes, and are stored in the information disc. When the disc tray is retracted, the disc driving unit 120 gets ready to read out any one of the plural sets of music data codes from the information disc. In this instance, the formats of music data codes are defined in MIDI (Musical Instrument Digital Interface) protocols.

Figure 3:
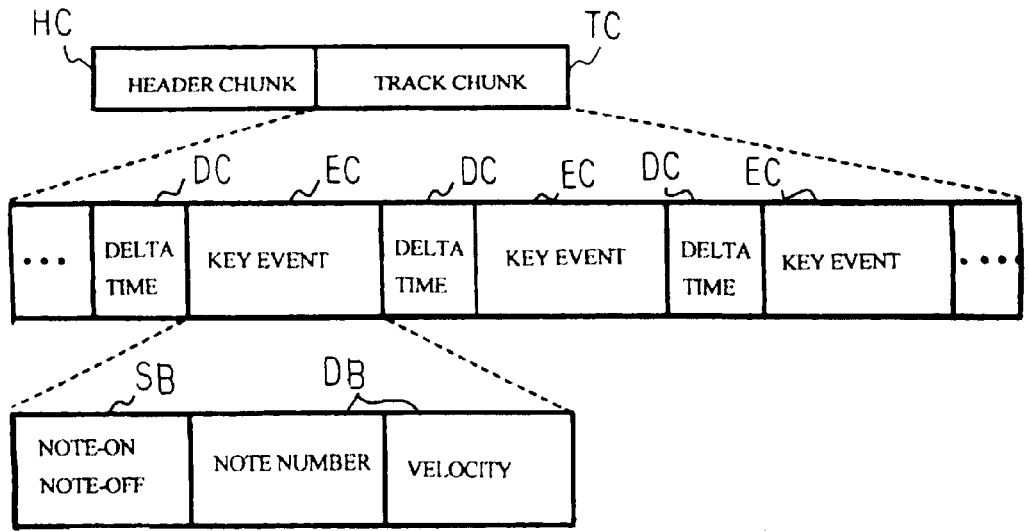
FIG. 3 is a view showing the data fields of a standard MIDI file.

FIG. 3 shows the data fields of a standard MIDI file. The standard MIDI file is broken down into a header chunk HC and a track chunk TC, and duration data codes DC and key event data codes EC are stored in the track chunk TC. Pieces of attribute data express the attributes of standard MIDI file such as the title of music tune, and are stored in the header chunk HC. Each of the duration data codes DC expresses a lapse of time between the key event and the next key event, i.e., delta time, and each of the key event data codes EC expresses the key event. Each of the key event data codes has a status byte SB and a data byte or data bytes DB. The status byte expresses the note-on key event or note-off key event, and the data bytes express the note number and velocity. A tone is produced in the note-on key event, and the tone is decayed in the note-off key event. The note number expresses the pitch of tone, and the velocity is equivalent to the loudness of tone.

Pieces of music tune data are read out from the header chunks so as to produce a menu of music tunes on the touch panel 130, and a user chooses a music tune from the menu for the automatic playing or electronic proof. When the user chooses a music tune, the music data codes such as the duration data codes DC and key event data codes EC are transferred from the track chunk TC to the working memory by means of the disc driving unit 120.

The electronic tone generator 25 includes a waveform memory, data read-out modules and a sound system, and a headphone is incorporated in the sound system together with amplifiers and loudspeakers. When a key event data code arrives at the electronic tone generator 25, the note number and loudness of tone to be produced are determined on the basis of the key event data code. When the time period from the previous key event is expired, the data read-out module starts to read out pieces of waveform data expressing the waveform of an audio signal from the waveform memory. The pieces of waveform data are formed into the audio signal, and the audio signal is supplied through the amplifiers to the loudspeakers or headphone.

Behavior of Automatic Player Musical Instrument

Assuming now that a user instructs the electric system 20 to perform a music tune, the music data codes are transferred from the track chunk TC to the working memory, and the main routine program starts periodically to branch the subroutine program for the automatic playing system.

While the computer program is running on the information processor, the piano controller 12b measures the lapse of time from the previous key event expressed by the duration data codes DC, and determines reference forward key trajectories for the black keys 1b to be depressed and white keys 1c to be depressed.

The reference forward key trajectory is a series of value of target key position varied with time. If a black key 1b or white key 1c travels on the reference forward key trajectory, the black key 1b or white key 1c passes a reference point at a target value of reference key velocity. The key velocity at the reference key point is well proportional to the hammer velocity immediately before the collision with the string 4, and the hammer velocity immediately before the collision is well proportional to the loudness of tone. For this reason, it is possible to control the loudness of tones by using the reference forward key trajectory.

When the time to start the black key 1b or white key 1c comes, the piano controller 12b starts to supply the target values of key position on the reference forward key trajectory to the servo controller 12c. The servo controller 12c calculates a target key velocity on the basis of series of target key position on the reference forward key trajectory. The actual key position is expressed by the key position signal S3, and the plunger velocity is equivalent to the actual key velocity.

The servo controller 12c compares the target key position and target key velocity with the actual key position and actual key velocity to see whether or not any difference is found between the target key position and the actual key position and between the target key velocity and the actual key velocity. While the black key 1b or white key 1c is exactly traveling on the reference forward key trajectory, the differences are approximately equal to zero. However, the difference or differences are found on the condition that the black key 1b or white key 1c is deviated from the reference forward key trajectory. When the servo controller 12c finds the difference or differences, the servo controller 12c determines a target value of the mean current for the driving signal S1 in such a manner as to minimize the difference or differences, and adjusts the driving signal S1 to the target value.

The above-described control sequence is periodically repeated. As a result, the black key 1b or white key 1c is forced to travel on the reference forward key velocity, and passes the reference point at the reference key velocity. The solenoid-operated key actuator 5 makes the black key 1b or white key 1c moved from the rest position toward the end position, and causes the key action unit 3 to drive the hammer 2 for rotation toward the string 4. Since the hammer 2 is brought into collision with the string 4 at the target value of hammer velocity proportional to the reference key velocity, the acoustic piano tone is produced at the target value of loudness equivalent to the velocity stored in the key event data code EC.

The time to process the note-off key event data code is assumed to come. The piano controller 12b determines a reference backward key trajectory on the basis of the piece of note-off event data. The reference backward key trajectory is a series of values of target key position toward the rest position. If the black key 1b or white key 1c travels on the reference backward key trajectory, the released key 1b/1c permits the damper 6 to be brought into contact with the vibrating string 4 at the time to make the note-off event occur, and the acoustic piano tone is decayed. The values of target key position are periodically supplied from the motion controller piano controller 12b to the servo controller 12c, and the servo controller 12c forces the released key 1b/1c to travel on the reference backward key trajectory. As a result, the damper 6 is brought into contact with the string 4 so as to decay the acoustic piano tone at the time to decay it.

The servo controller 12c, solenoid-operated key actuators 5, key sensors 26 and built-in plunger sensors form a feedback control loop for the black keys 1b and white keys 1c, and the piano controller 12a drives the black keys 1b and white keys 1c for the note-on key events and note-off key events expressed by the key event data codes through the feedback control loop. The acoustic piano tones are produced and decayed along the music tune. Thus, the automatic playing system makes the note-on key events and note-off key events sequentially occur as defined in the music data codes.

A human player is assumed to instruct the electric system 20 to let him or her know incorrect fingering, if any. The human player chooses a music tune, which he or she is going to play, from the menu, and the music data codes are transferred from the track chunk of a standard MIDI file for the music tune to the working memory. The main routine program starts periodically to branch to the subroutine program for the electronic proof.

Figure 4:
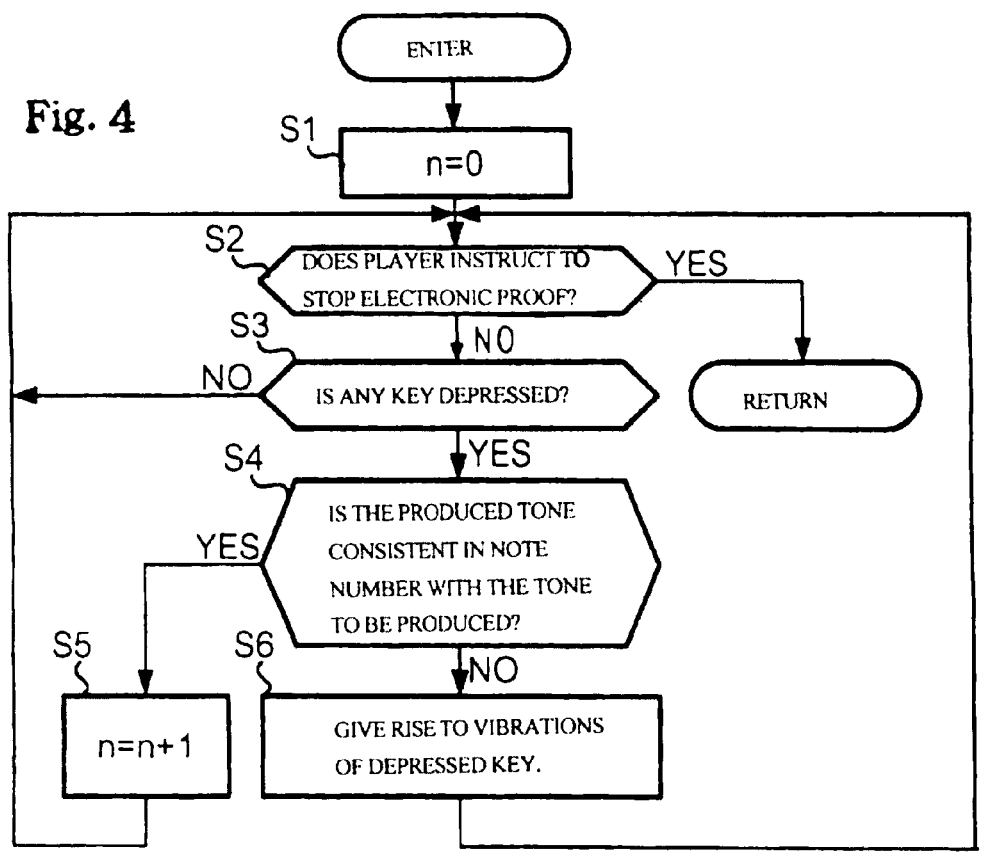
FIG. 4 is a flowchart showing the sequence of jobs for electronic proof.
Figure 5:
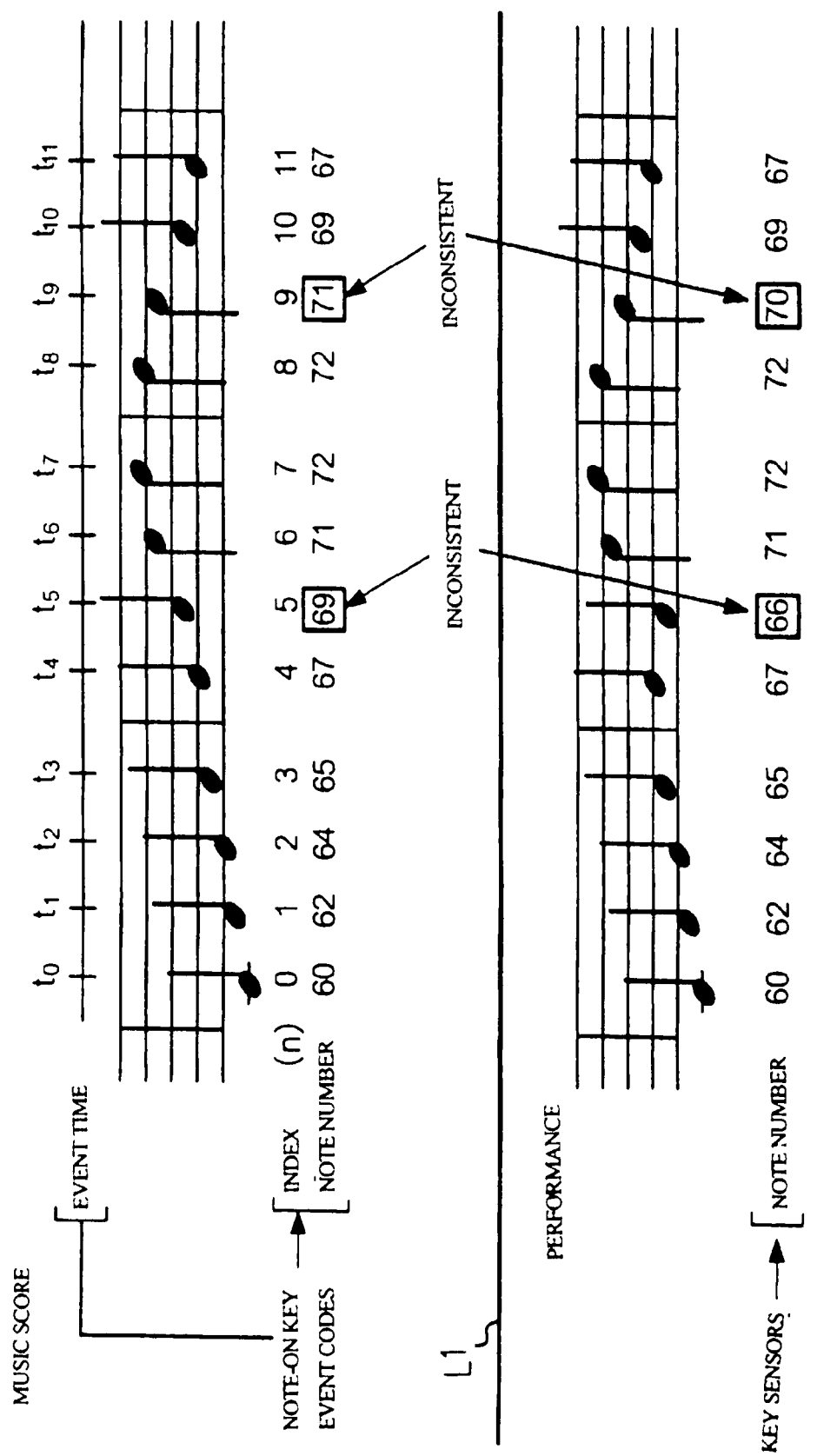
FIG. 5 is a view showing a music passage written in a music score and a music passage performed by a human player.

FIG. 4 shows the sequence of jobs in the subroutine program for the electronic proof. Index n is assigned to the note-on key events, and the note-on key events read out from the track chunk TC are correlated with the index n in the area over a bar L1 in FIG. 5. In detail, the index "0" is indicative of the first note-on key event, and the index "1", "2", ... are respectively indicative of the second note-on key event, third note-on key event ... "Event time" is a time at which the note-on key event is to occur. The first note-on key event "0" is to occur at event time t0, and the acoustic piano tone is to be produced at note number "60" in the first note-on event. The second note-on key event "1" is to occur at event time t1, and the acoustic piano tone is to be produced at note number "62" in the second note-on event. The third note-on key event "2" is to occur at event time t2, and the acoustic piano tone is to be produced at note number "64" in the third note-on event. The sixth note-on key event "5" is to occur at event time t5, and the acoustic piano tone is to be produced at note number "69" in the sixth note-on key event. The tenth note-on key event "9" is to occur at event time t9, and the acoustic piano tone is produced at note number "71" in the tenth note-on key event.

Upon completion of the data transfer from the track chunk TC to the working memory, the central processing unit starts to periodically fetches the pieces of key position data from the signal interface assigned to the key position signals S3, and accumulates the pieces of key position data in the working memory.

The central processing unit firstly sets an index register, which is indicative of the index n, to zero as by step S1, and transfers the note number at the index 0 from the working memory to an internal register.

Subsequently, the central processing unit checks a flag indicative of player's intention to see whether or not the human player has instructed the electronic proof system to complete the electronic proof as by step S2. While the human player is wishing to finger on the keyboard 1a, the flag is raised, and the answer at step S2 is given negative "No". On the other hand, when the human player instructs the electronic proof system to stop the electronic proof, the flag is taken down, and the answer at step S2 is given affirmative "Yes".

The answer at step S2 is given negative "No" before the human player starts to play the music tune. The central processing unit checks the working memory assigned to the pieces of key position data to see whether or not the human player depresses any key. The answer at step S4 is given negative "No" before his or her performance, and the central processing unit returns to step S2. Thus, the central processing unit reiterates the loop consisting of steps S2 and S3 until the human player starts to play the music tune.

When the human player starts to finger on the keyboard 1a, a series of values of piece of key position data is indicative of the downward movement of the key 1b/1c, and the answer at step S3 is changed to affirmative "Yes". The central processing unit determines the note number assigned to the depressed key 1b/1c, and stores the note number of depressed key 1b/1c into another internal register.

The central processing unit compares the note number at index 0 with the note number of depressed key 1b/1c to see whether or not the note number of depressed key 1b/1c is consistent with the note number of note-on key event at index 0. The depressed keys are correlated with the note number in the area lower than the bar L1 in FIG. 5.

The human player firstly depresses the key 1b/1c assigned the note number "60". This means that the human player correctly depresses the key at the beginning of his or her performance, and the answer at step 4 is given affirmative "Yes". Then, the central processing unit increments the index by 1 as by step S5, and returns to step S2. Thus, the central processing unit reiterates the loop consisting of steps 2 to 5 until the flag, which is indicative of the intention of player, is taken down.

The human player sequentially depresses the keys assigned the note number "62", "64", "65" and "67" in the note-on key events at 2, 3 and 4, and the note number of depressed keys is consistent with the note number of tones to be produced in the note-on key events. For this reason, the central processing unit trice reiterates the loop, and any notice is given to the human player for incorrect fingering.

After the comparison on the note-on key event code labeled with the index of 4, the central processing unit increments the index to 5 at step S5, and returns to step S2. The central processing unit gives the negative answer "No" at step S2 and positive answer "Yes" at step S3, and proceeds to step S4. When the human player depresses the next key 1b/1c, the central processing unit identifies the depressed black key 1b with the note number 66. However, the white key 1c with the note number 69 is to be depressed. Then, the central processing unit gives the negative number "No" at the step S4, and proceeds to step S6. The central processing unit and jobs at steps S3 and S4 serve as the comparator 12a shown in FIG. 2.

The central processing unit gives the notice of incorrect fingering to the human player at step S6. In this instance, the notice of incorrect fingering is given to the user as repetition of mistakenly depressed key 1b/1c as follows. The comparator 12a notifies the piano controller 12b of the incorrect fingering at the black key 1b assigned the key number 66. Then, the piano controller 12b determines a reference reciprocal key trajectory for the mistakenly depressed black key 1b. The reference reciprocal key trajectory is a series of values of key position varied together with time. Since the values of the series are indicative of the key position between the rest position and the end position plural times, the mistakenly depressed black key 1b is reciprocally to travel between the rest position and the end position plural times. The values of key position are periodically supplied from the piano controller 12b to the servo controller 12c. The servo controller 12c forces the key 1b/1c to travel on the reference reciprocal trajectory through the feedback control loop so that the mistakenly depressed key 1b/1c repeatedly actuates the associated action unit 3. The hammer 2 repeats the collision with the string 4, and gives rise to the tone F, repeatedly. The human player is notified of the incorrect fingering through both of the tactile impression of his or her finger and the audible tone.

The central processing unit returns to step S2 without any execution at step S5 so that the human player is expected to depress the white key 1c assigned the note number 69. If the human player mistakenly depresses a black key 1b or white key 1c assigned the note number different from 69, the central processing unit acknowledges the incorrect fingering, again, and gives the notice of incorrect fingering to the human player through both of the tactile impression and the audible tone.

The human player is assumed to continue his or her fingering from the white key 1c assigned the note number 69. The central processing unit admits that the human player correctly depresses the white key 1c, and increments the index from 5 to 6 at step S5.

The human player correctly depresses the white keys assigned the note numbers 71, 72 and 72, and the central processing unit stops the vibrations of mistakenly depressed key, and increments the index without any notice of incorrect fingering. After the increment of index from 8 to 9 at step S5, although the white key 1c assigned the note number 72 is followed by the white key 1c assigned the note number 71 on the music score, the human player mistakenly depresses the black key 1b assigned the note number 70. Then, the answer at step S4 is given negative "No", and the comparator 12a requests the piano controller 12b to produce the reference reciprocal trajectory for the black key 1b. The solenoid-operated key actuator 5 makes mistakenly depressed black key 1b repeatedly moved so that the tone B is repeatedly produced. Thus, the human player is notified of the incorrect fingering through both of the tactile impression and audible tone B. Thus, the electronic proof system checks the fingering on the keyboard 1a to see whether or not the human player mistakenly depresses the black keys 1b and white keys 1b, and gives the notice of incorrect fingering to the human player through both of the tactile impression and audible tones.

Figure 6:
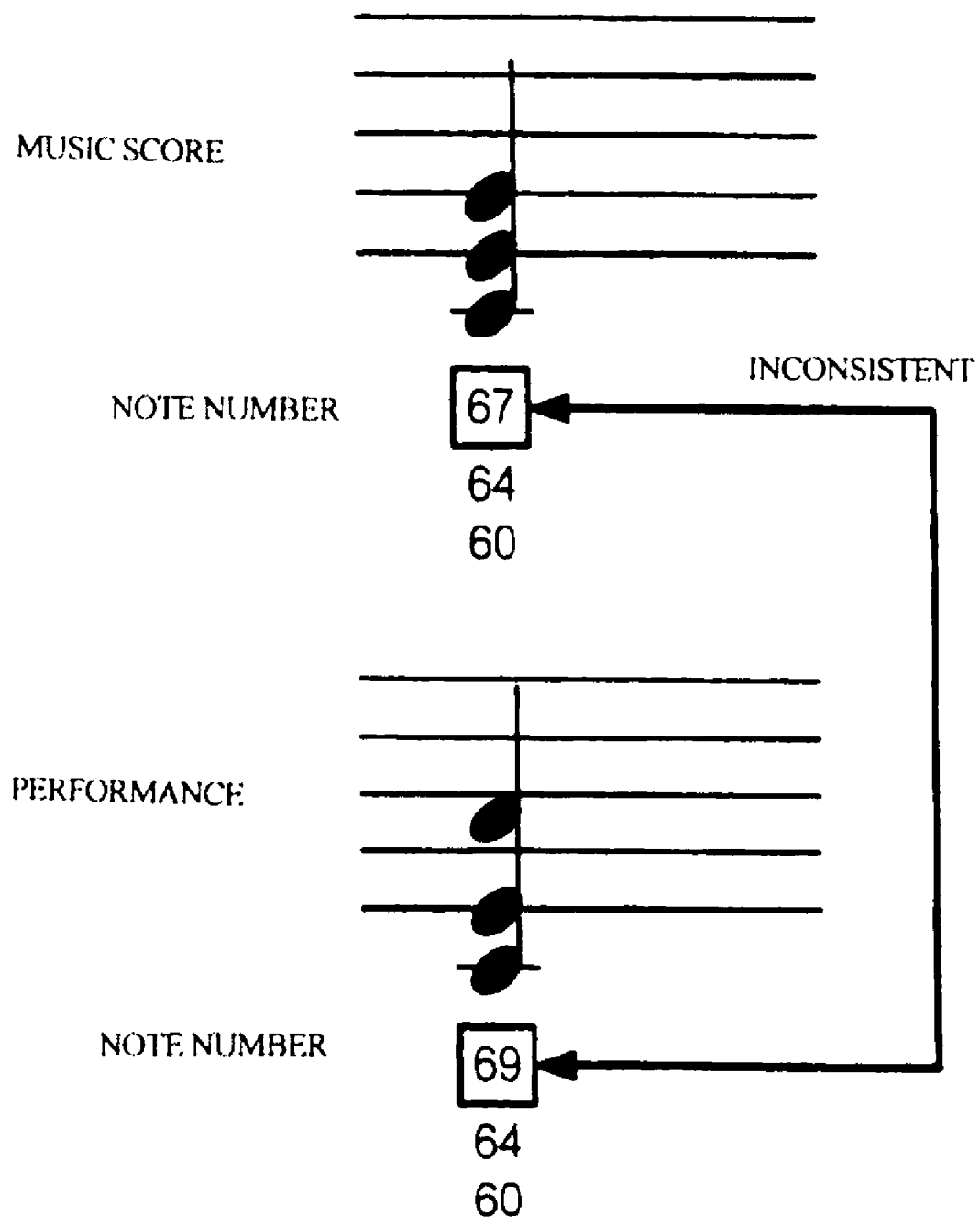
FIG. 6 is a view showing a chord to be produced and a chord produced.

A chord is assumed to be found on the music score as shown in FIG. 6. The chord is constituted by three quarter notes at C, E and G assigned the note numbers 60, 64 and 67. If the human player depresses three white keys C, E and A, which are assigned the note numbers 60, 64 and 69. When the central processing unit determines that the human player depresses the white keys assigned the note numbers 60, 64 and 69, the central processing unit finds the note number 69 inconsistent with all of the note numbers 60, 64 and 67. Then, the comparator 12a requests the piano controller 12b to produce the reference reciprocal trajectory for the white key 1c assigned the note number 69, and the servo controller 12c gives rise to the repetition of white key 1c by means of the solenoid-operated key actuator 5. Thus, the electronic proof system gives the notice of incorrect fingering to the human player. Although the human player has depressed the three white keys 1c, only the mistakenly depressed key 1c is reciprocally moved. For this reason, the human player is notified of the incorrect fingering at the note number 69.

When the human player completes the performance, he or she instructs the electric system 20 to stop the electronic proof through the touch panel 130. Then, the flag is taken down, and the main routine program does not branch to the subroutine program for the electronic proof. Otherwise, the human player permits a predetermined time period to be expired without any fingering. In this situation, the central processing unit presumes that the human player has completed the performance, and takes the flag down.

As will be appreciated from the foregoing description, the electronic proof system notifies the human player of the incorrect fingering through the tactile impression together with the tone. Even if the human player does not have good ears for the pitch of tones, he or she can exactly specify the mistakenly depressed key or keys. When the human player mistakenly depresses one of or two of the keys $1b/1c$ in a chord, the electronic proof system exactly lets the human player know the mistakenly depressed key or keys through the tactile impression.

Second Embodiment

Figure 7:
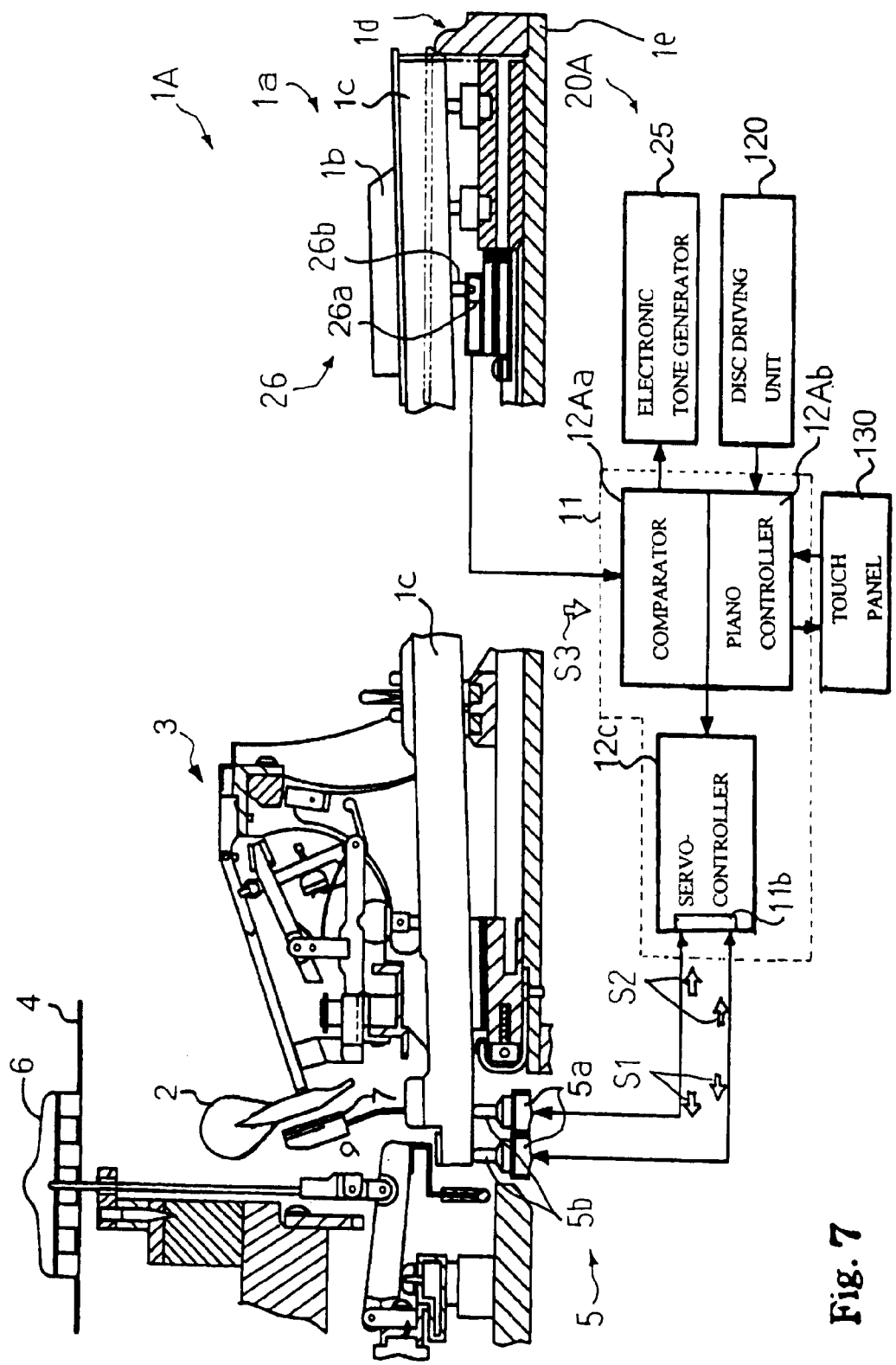
FIG. 7 is a schematic side view showing the structure of another automatic player musical instrument of the present invention.

Turning to FIG. 7 of the drawings, another automatic player musical instrument embodying the present invention largely comprises an acoustic piano 1A and an electric system 20A. The acoustic piano 1A is similar in structure to the acoustic piano 1, and, for this reason, component parts of acoustic piano 1A are labeled with references designating corresponding component parts of the acoustic piano 1 without detailed description.

The electric system 20A is similar in system configuration to the electric system 20 except for a comparator 12Aa and a piano controller 12Ab. The other system components of electric system 20A are labeled with references same as those designating corresponding system components, and description is hereinafter focused on the comparator 12Aa and piano controller 12Ab.

While a human player is fingering on the keyboard $1a$, the main routine program periodically branches to the subroutine program for the electronic proof, and the central processing unit reiterates the loop shown in FIG. 4 for the electronic proof as similar to the first embodiment. Although the comparator $12a$ informs the piano controller $12b$ of the note number assigned to the mistakenly depressed key, the comparator 12Aa informs the piano controller 12Ab of the note numbers respectively assigned to both of the mistakenly depressed key $1b/1c$ and the black or white key $1b/1c$ to be depressed so as to make the piano controller 12Ab produce reference reciprocal trajectories for both keys. Each of the reference reciprocal trajectories does not express the repeated movement of key for the repetition, but expresses a simple reciprocal movement of key. For this reason, the tone is once produced from the vibrating string 4 for the mistakenly depressed key $1b/1c$, and the tone to be produced is also once produced from the vibrating string 4.

Figure 8:
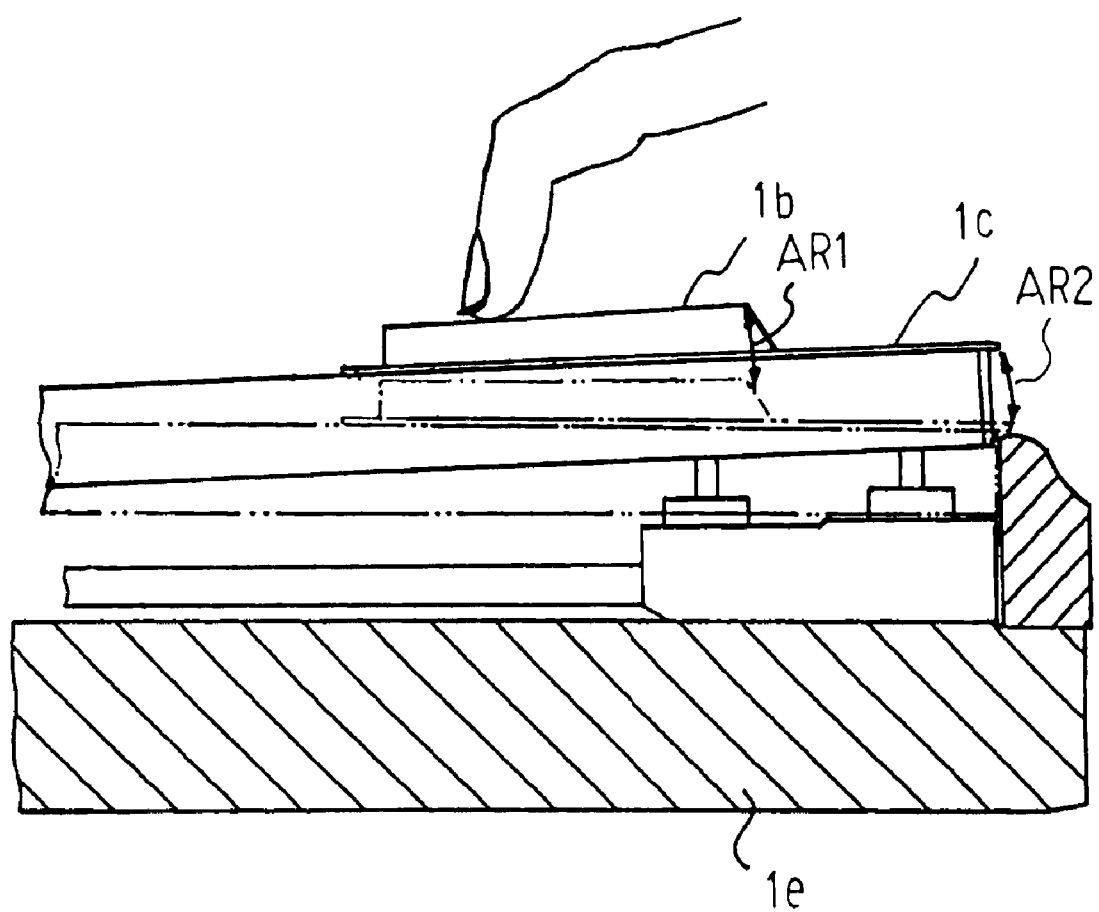
FIG. 8 is a cross sectional side view showing a white key to be depressed and a mistakenly depressed black key of the automatic player musical instrument.

Assuming now that the human player mistakenly depresses the black key $1b$ instead of the white key $1c$ as shown in FIG. 8, the negative answer "No" is given at step S4, and the central processing unit proceeds to the step S6.

The comparator 12Aa informs the piano controller 12Ab of the note number assigned to the white key $1c$ as well as the note number assigned to the mistakenly depressed black key $1b$. The piano controller 12Ab determines the reference reciprocal trajectories for both of the mistakenly depressed black key $1b$ and white key $1c$ to be depressed, and periodically supplies values of target key position for the mistakenly depressed black key $1b$ and values of target key position for the white key $1c$ to be depressed. Although the reference reciprocal trajectory for the mistakenly depressed black key $1b$ makes the mistakenly depressed black key $1b$ quickly moved, the reference reciprocal trajectory for the white key $1c$ makes the white key slowly moved between the rest position and the end position. The slow reciprocal movement of white key $1c$ makes the human player discriminate from the mistakenly depressed black key $1b$.

The servo controller $12c$ forces the black key $1b$ and white key $1c$ to travel on the reference reciprocal key trajectories by means of the solenoid-operated key actuators 5. As a result, the mistakenly depressed black key $1b$ is once moved as indicated by arrow AR1 for the notice of incorrect fingering, and the white key $1c$ is once moved as indicated by arrow AR2 for a notice of prompt correction.

As will be appreciated from the foregoing description, the electronic proof system gives not only the notice of incorrect fingering but also the notice of prompt correction to the human player through the tactile sense. Even if the human player does not have good ears for the pitch of tones, he or she recognizes the incorrect fingering, and further accepts the prompt correction.

Third Embodiment

Figure 9:
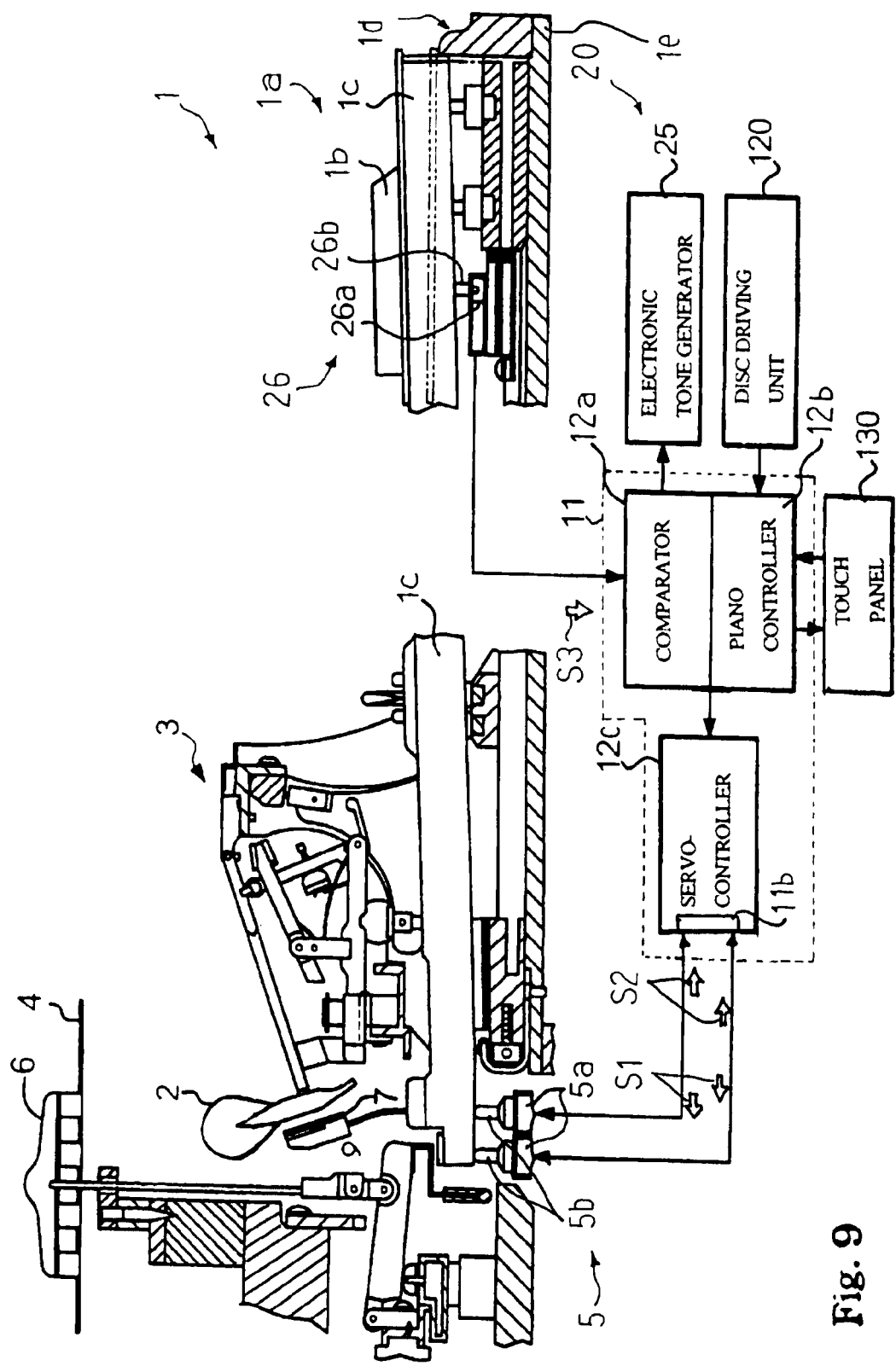
FIG. 9 is a schematic side view showing the structure of yet another automatic player musical instrument of the present invention.

Turning to FIG. 9 of the drawings, yet another automatic player musical instrument embodying the present invention largely comprises an acoustic piano 1B and an electric system 20B. The acoustic piano 1B is similar in structure to the acoustic piano 1, and, for this reason, component parts of acoustic piano 1B are labeled with references same as those designating corresponding component parts of the acoustic piano 1 without detailed description.

The electric system 20B is similar in system configuration to the electric system 20 except for a comparator 12Ba and a piano controller 12Bb. Although the piano controller $12b$ starts to supply the values of target key position immediately after the preparation of the reference reciprocal trajectory, the piano controller 12Bb starts to supply the values of target key position after the mistakenly depressed key returns to the rest position.

Figure 10:
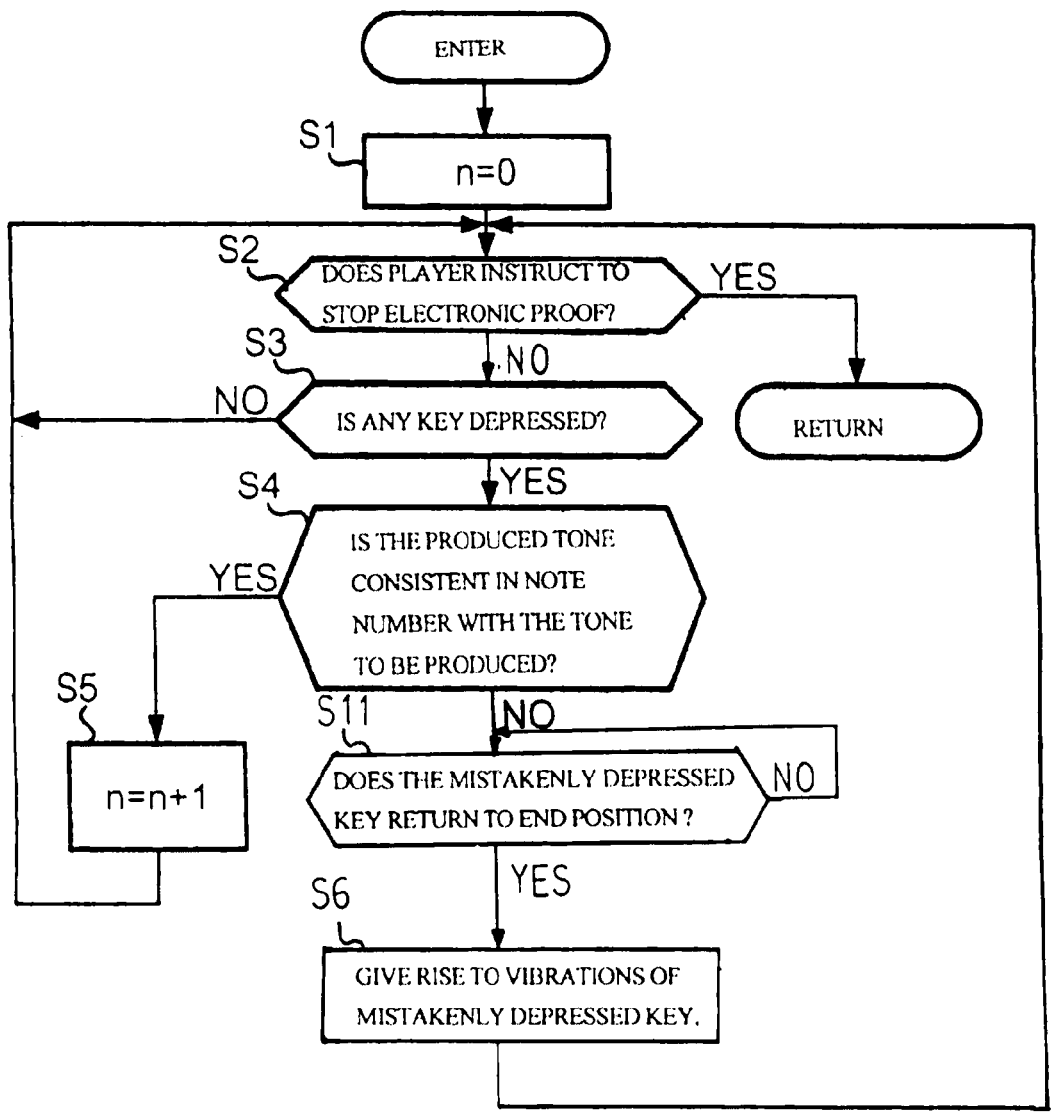
FIG. 10 is a flowchart showing a sequence of jobs for the electric proof.

In detail, FIG. 10 shows a sequence of jobs for the electronic proof. Steps S1, S2, S3, S4, S5 and S6 are same as those of the steps shown in FIG. 4. The sequence of jobs shown in FIG. 10 is different from the sequence of jobs shown in FIG. 4 in that step S11 is inserted between step S4 and step S6. When the central processing unit finds a mistakenly depressed key $1b/1c$, the answer at step S4 is given negative "No", and proceeds to step S11.

The central processing unit periodically checks the working memory to see whether or not the mistakenly depressed key $1b/1c$ returns to the rest position. While the human player is keeping the mistakenly depressed key $1b/1c$ at the end position or is traveling on the way to the rest position, the answer at step S11 is given negative "No". The central processing unit repeatedly checks the working memory until the answer is changed to affirmative "Yes". When the mistakenly depressed key $1b/1c$ reaches the rest position, the answer at step S11 is changed to affirmative "Yes", and the central processing unit proceeds to step S6 so as to give the notice of incorrect fingering to the human player.

Thus, the electronic proof system gives the human player the notice of incorrect fingering through the tactile impression after the release of the mistakenly depressed key $1b/1c$. The mistakenly depressed key $1b/1c$ does not vibrate while the human player is keeping the mistakenly depressed key on the loci of key. The electronic proof system does not interfere the fingering of human player.

Fourth Embodiment

Figure 11:
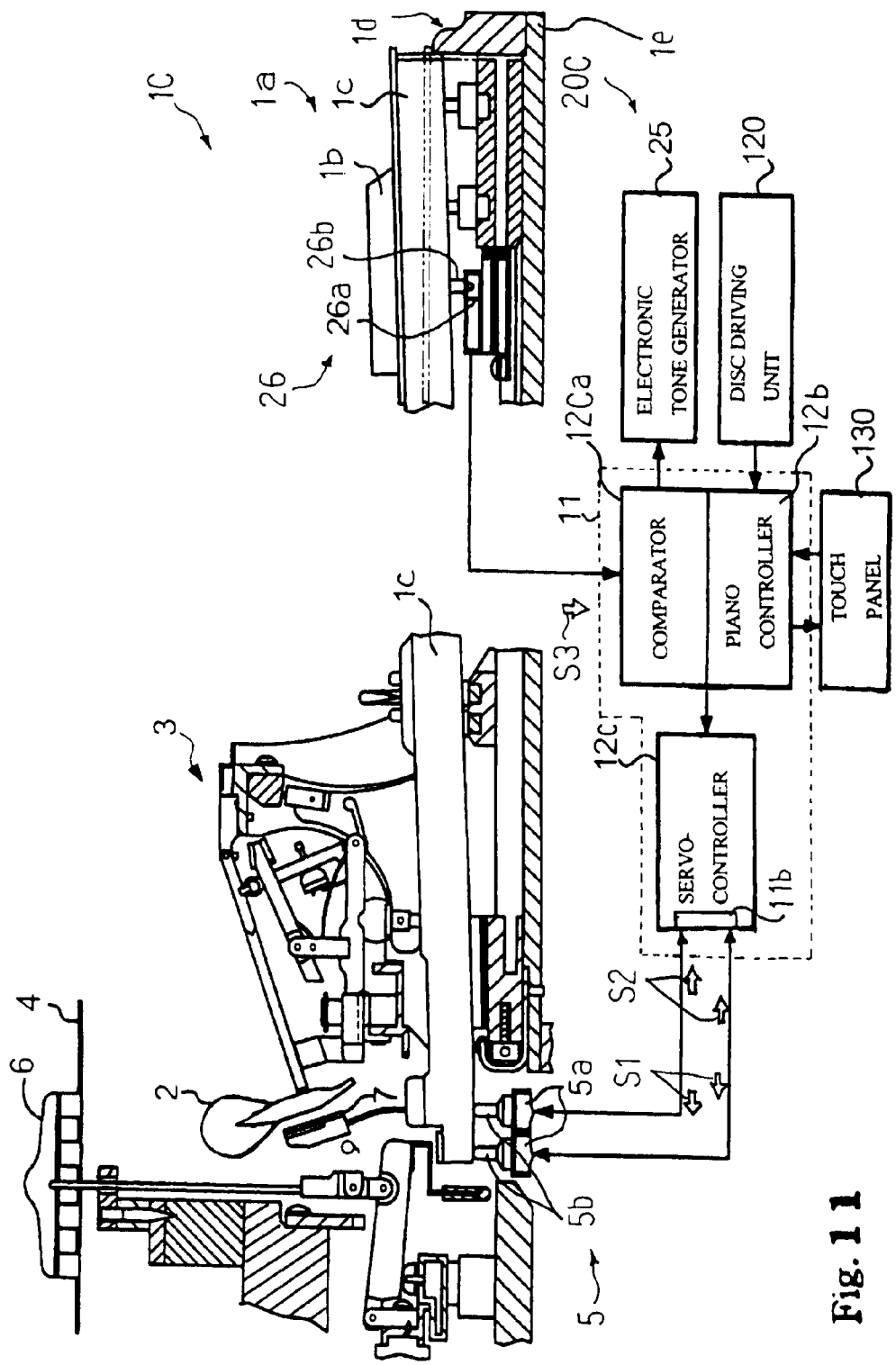
FIG. 11 is a schematic side view showing the structure of still another automatic player musical instrument of the present invention.

Turning to FIG. 11 of the drawings, still another automatic player musical instrument embodying the present invention largely comprises an acoustic piano 1C and an electric system 20C. The acoustic piano 1C is similar in structure to the acoustic piano 1, and, for this reason, component parts of acoustic piano 1C are labeled with references same as those designating corresponding component parts of the acoustic piano 1 without detailed description.

The electric system 20C is similar in system configuration to the electric system 20 except for a comparator 12Ca. For this reason, description is hereinafter focused on the comparator 12Ca. The comparator 12Ca compares the event time (see FIG. 5) with tone generating time as well as the keys 1b/1c to be depressed and the depressed keys 1b/1c. The tone generating time is a time at which the sensor detects the downward movement of a key.

Figure 12:
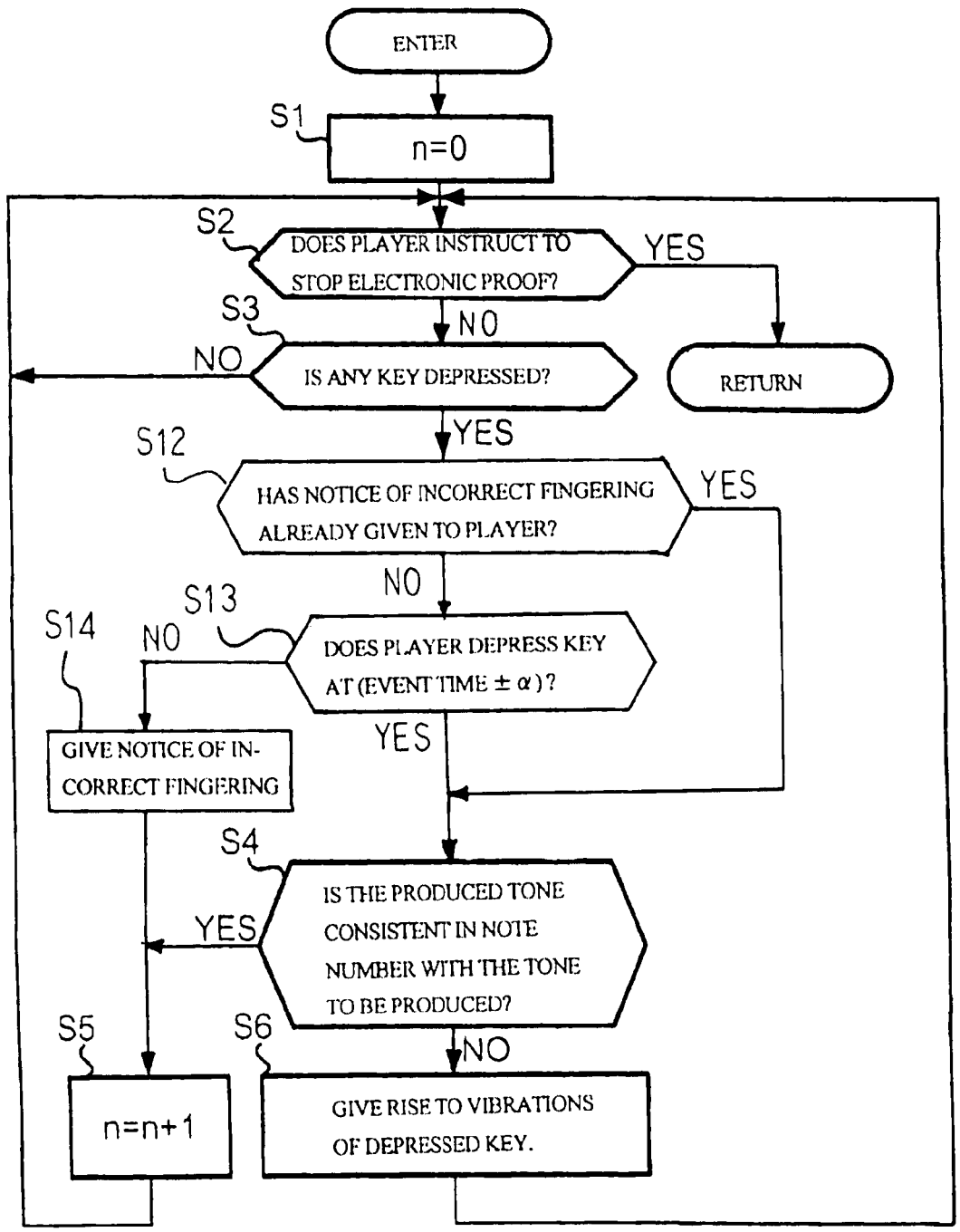
FIG. 12 is a flowchart showing a sequence of jobs for the electronic.

FIG. 12 shows a sequence of jobs for the electronic proof system. Jobs at steps S1, S2, S3, S4, S5 and S6 are same as those shown in FIG. 4. Steps S12 are S13 are inserted between step S3 and step S4, and step S14 is inserted between step S13 and S5. As described hereinbefore in conjunction with the sequence of jobs shown in FIG. 4, the event time is defined for each of the note-on events.

When the human player depresses a black key 1b or white key 1c, the answer at step S3 is changed to affirmative "Yes", and the central processing unit checks a flag indicative of the issuance of the notice of incorrect fingering to see whether or not the human player has been already given the notice of incorrect fingering for the note-on key event data code as by step S12. When the human player firstly depresses the black key 1b or white key 1c for the present note-on key event, the answer at step S12 is give negative "No", and the central processing unit proceeds to step S13. On the other hand, if the electronic proof system had already given the human player the notice of incorrect fingering, the human player depressed the black key 1b or white key 1c in response to the notice of incorrect fingering, and the central processing unit skips the job at step S13.

With the negative answer at step S12, the central processing unit reads an internal clock so as to determine the lapse of time between the previous tone generating time and the current tone generating time. The central processing unit compares the lapse of time between the previous event time and the present event time with the lapse of time between the previous tone generating time and the present tone generating time to see whether or not the difference is fallen within a certain time period α as by step S13. The certain time period may be determined on the basis of the note at the previous note-on key event and the note at the present note-on key event. If the difference is longer than the certain time period, the answer at step S13 is given negative "No", and the electronic proof system gives the notice of incorrect fingering as by step S14. The electronic proof system gives rise to the vibrations of correct key for a certain time period as the notice of incorrect fingering at step S14. Since it is impossible to correct the timing to depress the black key 1b or white key 1c, the central processing unit increments the index at step S5 after the notice of incorrect fingering at step S14.

On the other hand, if the difference is equal to or less than the certain time period, the answer at step S13 is given affirmative "Yes", and the central processing unit checks the note number of the depressed key 1b/1c with the note number of the note-on key event code to see whether or not the human player correctly depresses the black key 1b or white key 1c as by step S4. When the answers at both of steps S12 and S4 are given affirmative "Yes", the electronic proof system admits that the human player correctly fingers, and increments the index as by step S5. However, even if the human player timely depresses the black key 1b or white key 1c, the note number of the depressed key 1b/1c may be different from the note number of the note-on key event code. In this situation, the answer at step S4 is given negative "No", and the central processing unit gives the notice of incorrect fingering at step S6. Upon completion of the job at step S6, the central processing unit returns to step S2.

As will be understood from the forgoing description, when the human player depresses a key different in note number from that stored in the note-on key event code or untimely depresses the correct key, the electronic proof system gives the notice of incorrect fingering to the human player through the tactile impression.

Fifth Embodiment

Figure 13:
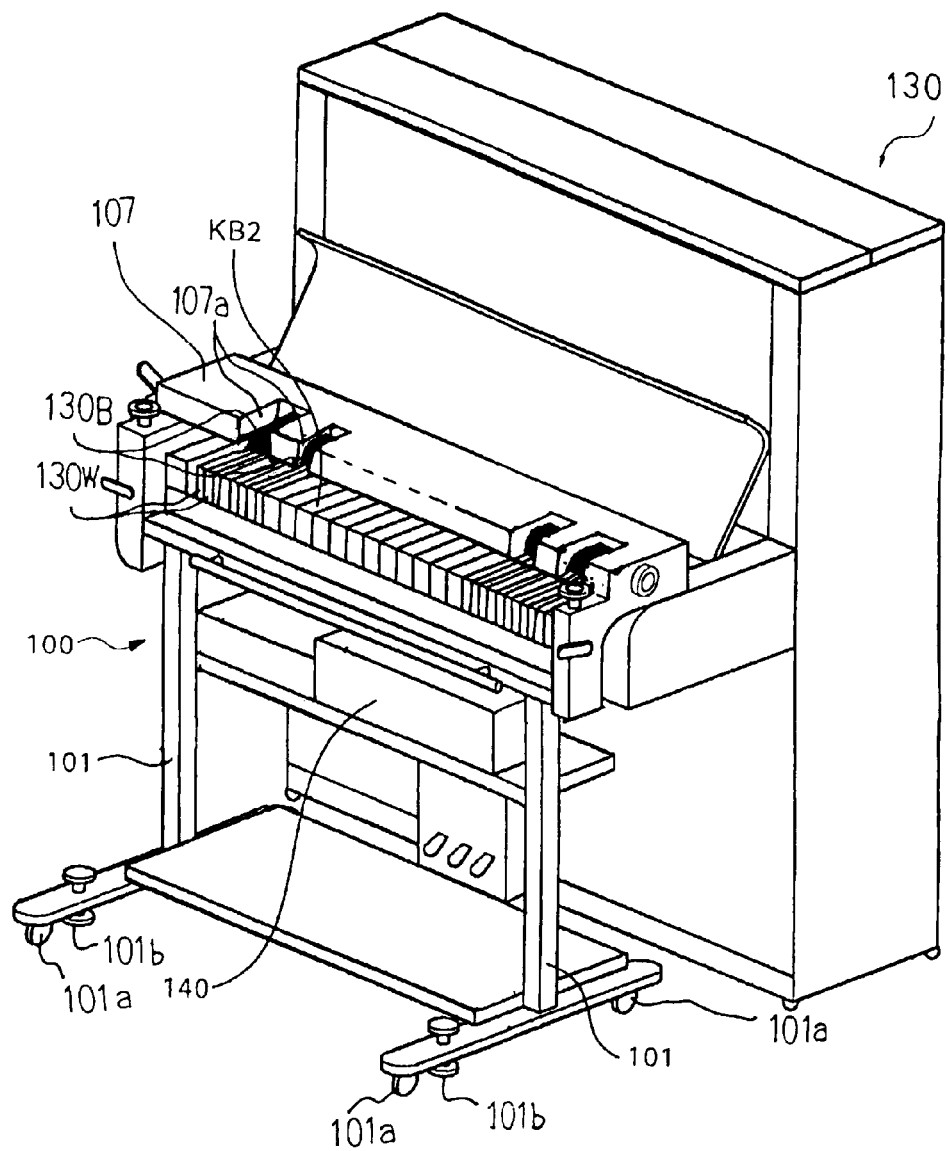
FIG. 13 is a schematic perspective view showing a portable electronic proof system of the present invention put on an upright piano.
Figure 14:
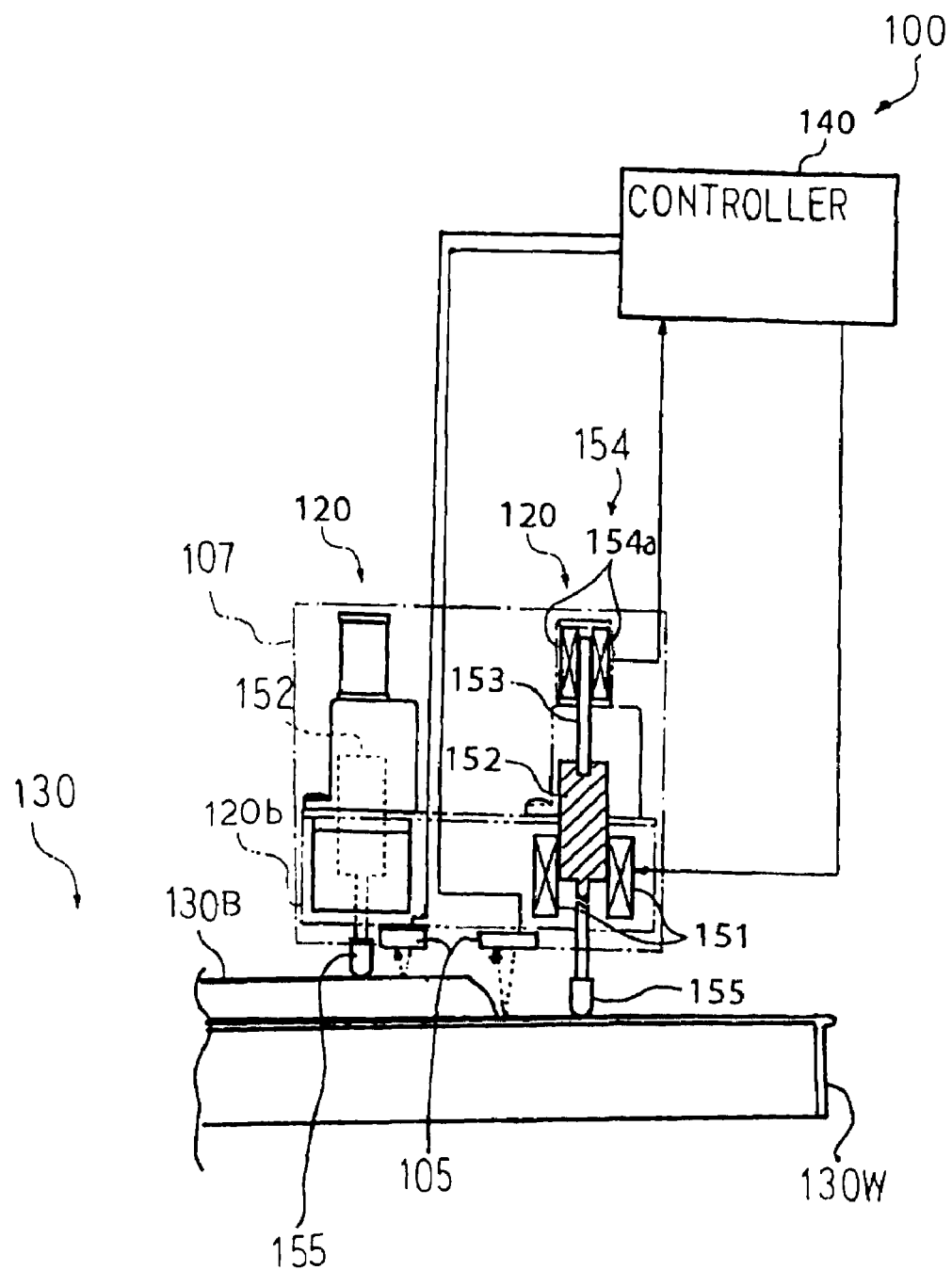
FIG. 14 is a schematic cross sectional view showing the structure of the portable electronic proof system.

Turning to FIGS. 13 and 14 of the drawings, a portable electronic proof system 100 embodying the present invention is put on an upright piano 130. The portable electronic proof system 100 includes an array of key sensors 105, a housing 107, an array of solenoid-operated key actuators 120 and a controller 140. The controller 140 is connected to the solenoid-operated key actuators 120 and key sensors 105 through bundles of cables. The electric power is supplied from a power source (not shown) through the controller 140 to the solenoid-operated key actuators 120 and key sensors 105. In this instance, a buttery serves as the power source, and is provided inside the controller 140.

The controller 140 is put on a rack 101, and the rack 101 is movable on the floor by means of casters 101a. Stoppers 101b keeps the rack 101 at any position on the floor stable. The array of solenoid-operated key actuators 102 and array of key sensors 105 are accommodated in a housing 107, and the housing 107 is supported by the rack 101 in a cantilever fashion. The rack 101 is moved to an appropriate position in front of the upright piano 130, and the housing 107 and, accordingly, the solenoid-operated key actuators 102 and array of key sensors 105 are maintained over a keyboard KB, which is an array of black keys 130B and white keys 130W. The user makes the housing 107 brought into contact with the side arms or key blocks of the upright piano 130 so that the side arms or key blocks bear the housing 107.

The housing 107 have plural inlets 107a. The black keys 130B are exposed to the inlets 107a, and the front portions of white keys 130W are found in front of the housing 107.

The solenoid-operated key actuator 120 includes a solenoid 151 supported by the yoke 120b, a plunger 152 extending in the up-and-down direction through the solenoid 151, a built-in plunger velocity sensor 154 and a resilient cap 155. Although the plungers 152 downwardly projects from the housing, the solenoid 151 and plunger 152 are similar to those of the first embodiment, and no further description is hereinafter incorporated for the sake of simplicity. The built-in plunger velocity sensor 154 is implemented by a combination of a permanent magnetic rod 153 and a coil 154a. The plunger 152 is connected to the permanent magnetic rod 153 so that the permanent magnetic rod 153 is moved together with the plunger 152.

The controller 140 includes an information processing system, which is similar to that of the first embodiment, and the computer program runs on the central processing unit of the information processing system. The computer program includes the main routine program, subroutine program for the automatic playing and subroutine program for the electronic proof. The main routine program and subroutine programs are similar to those of the first embodiment so that the portable electronic proof system behaves as similar to the electronic proof system of the first embodiment.

The portable electronic proof system achieves all the advantages of the first embodiment. Moreover, the portable electronic proof system is combinable with various acoustic pianos.

Sixth Embodiment

Figure 15:
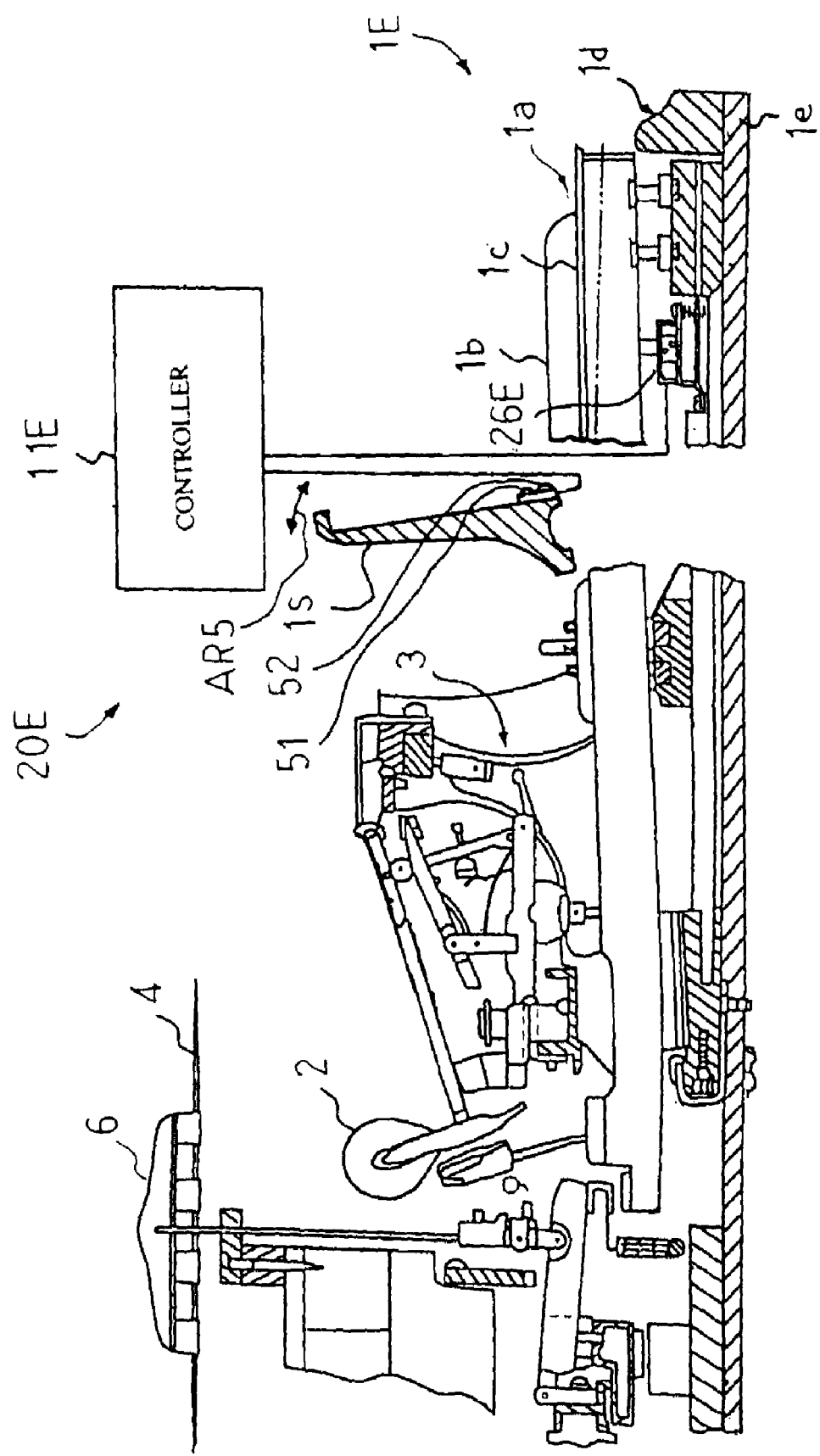
FIG. 15 is a schematic side view showing the structure of yet another automatic player musical instrument of the present invention.

Turning to FIG. 15 of the drawings, yet another automatic player musical instrument embodying the present invention largely comprises an acoustic grand piano 1E and an electric system 20E. The acoustic grand piano 1E is similar in structure to the acoustic piano 1, and, for this reason, component parts of acoustic piano 1E are labeled with references same as those designating corresponding component parts of the acoustic piano 1 without detailed description.

A fallboard is labeled with reference 1s, and is rotatable in a direction indicated by arrow AR5. While the fallboard is standing against an upper beam (not shown) of the piano cabinet 1d as shown in FIG. 15, the keyboard 1a is exposed to a human player who is sitting on a stool for fingering. When the human player closes the fallboard 1s, the keyboard 1a is covered with the fallboard 1s.

The electric system 20C includes a controller 11E, an array of key sensors 26E and an array of light emitting elements 51 and 52. The key sensors 26E are same as the key sensors 26, and no further description is hereinafter incorporated. The light emitting elements 5 1 and 52 are connected in parallel to the controller 11E, and are selectively energized by the controller 11E.

The light emitting elements 51 are respectively associated with the black keys 1b, and are provided on an area of the inner surface of the fallboard 1s. The light emitting elements 52 are respectively associated with the white keys 1c, and are provided on another area of the inner surface of the fallboard 1s. The area assigned to the light emitting elements 51 laterally extends, and is contiguous to the area assigned to the light emitting elements 52. Thus, the light emitting elements 51 form an upper row, and the light emitting elements 52 form a lower row on the inner surface of the fallboard 1s. The light emitting elements 51 are in close proximity to the associated black keys 1b, respectively, and the light emitting elements 52 are in close proximity to the associated white keys 1c, respectively. For this reason, the human player recognizes that the light emitting elements 51 and light emitting elements 52 represent the associated black keys 1b and associated white keys 1c, respectively.

The controller 11E has an information processing system, a man-machine interface and a signal interface, and a computer program runs on the central processing unit of the information processing system. The computer program is broken down into a main routine program and subroutine programs, and one of the subroutine programs is prepared for electronic proof. The information processing system, subroutine program for the electronic proof, key sensors 26E and array of light emitting elements 51/52 as a whole constitute an electronic proof system.

While the main routine program is running on the central processing unit, the human player can give an instruction to the central processing unit through the man-machine interface. When the human player gives the central processing unit an instruction for the electronic proof, the music data codes are transferred to the working memory of the information processing system, and the main routine program periodically branches to the subroutine program for the electronic proof. The central processing unit periodically fetches pieces of key position data from the signal interface assigned to the key sensors 26E, and accumulates the pieces of key position data in the working memory.

While the human player is practicing a music tune on the keyboard 1a, the central processing unit checks the working memory to see whether or not the human player depresses any key 1b or 1c. When the answer is given affirmative, the central processing unit compares the note number of the depressed key 1b/1c with the note number stored in the key event data code to see whether or not the note numbers are consistent with one another. When the answer is given affirmative, the central processing unit does not energize any light emitting element 51/52.

If the human player mistakenly depresses a key 1b/1c different from the key to be depressed, the answer is given negative, and the central processing unit makes the signal interface supply a driving signal to the light emitting element 51/52 associated with the mistakenly depressed key 1b/1c. The light emitting element radiates the light, and the human player notices the mistakenly depressed key 1b/1c. Thus, the controller 11E gives a notice of incorrect fingering to the visual sensation of the human player through the light.

As will be understood from the foregoing description, even if the human player does not have good ears for the pitch of tones, the electronic proof system makes it possible to specify the mistakenly depressed key 1b/1c.

Although particular embodiments of the present invention have been shown and described, it will be apparent to those skilled in the art that various changes and modifications may be made without departing from the spirit and scope of the present invention.

The key sensors 26 are expected to convert the current key position of black keys 1b and current key position of white keys 1c to the key position signals S3 so that the sensor heads 26a and optical modulator 26b form the key sensors 26. However, the key sensors for the electronic proof are expected to detect the downward movements of the black keys 1b and the downward movements of the white keys 1c. For this reason, the key sensors for the electronic proof may have a structure simpler than the structure of key sensors 26. For example, photo-couplers may be provided under the black keys 1b and white keys 1c.

The plungers 5b may be coupled to the rear portions of the black and white keys 1b/1c. In this instance, the electronic proof system can give the notice of incorrect fingering to the human player by strongly pushing up the mistakenly depressed key by means of the solenoid-operated key actuator.

The acoustic piano 1 does not set any limit to the technical scope of the present invention. Any sort of keyboard musical instrument such as, for example, an organ or a harpsichord may form a part of the automatic player musical instrument, and the electronic proof system is installed in the electric system of the automatic player musical instrument fabricated on the basis of the other sorts of keyboard musical instrument.

Moreover, an automatic playing system may be combined with another sort of musical instrument such as, for example, a percussion instrument or a wind musical instrument. A celesta is an example of the percussion instrument, and a saxophone is an example of the wind musical instrument.

The portable electronic proof system may be combined with an acoustic musical instrument, which is not equipped with any automatic playing system, such as, for example, a piano, an organ and so forth. Moreover, the portable electronic proof system may be combined with an electronic key-board.

The electric system 20 or electronic proof system may be installed after the acoustic piano 1 is delivered to a user.

The notice of prompt correction may be given to the human player through a means different from the means for the notice of incorrect fingering. For example, one of the notices may be given through the tactile impression, and the other of the notices through another sense such as, for example, the sense of sight. For example, light emitting elements are embedded in the black keys 1*b* and white keys 1*c*, and the light emitting element for the mistakenly depressed key or key to be depressed is energized for emitting light.

The electronic proof system implementing the third embodiment vibrates the mistakenly depressed key after return to the rest position in order to prevent the human player from interference in the fingering. A modification of the third embodiment has an electronic proof system, which gives rise to the movements of keys on both sides of the mistakenly depressed key after expiry of a predetermined time period. If the human player notices the incorrect fingering, he or she will release the mistakenly depressed key within a short time period. There is a possibility that the human player does not notice the incorrect fingering at the expiry of predetermined time period. For this reason, the electronic proof system gives the notice of incorrect fingering.

In the above-described modification, the electronic proof system gives rise to the movements of keys on both of the mistakenly depressed key. The keys on both sides of the mistakenly depressed key do not set any limit to the technical scope of the present invention. The electronic proof system of the modification may give rise to movements of any key, which relates to the mistakenly depressed key, such as, for example, the key assigned the pitch name one octave over the mistakenly depressed key.

Yet another modification of the third embodiment may includes an electronic proof system, which varies the frequency of vibrations of the related key or keys depending upon the time period over which the human player continues mistakenly to depress the key.

The notice of incorrect fingering is given to the human player through both of the tactile impression and audible tone in the above-described embodiment. However, the notice of incorrect fingering may be given through only the tactile impression. If the repetition of mistakenly depressed key 1*b*/1*c* exceeds a threshold such as 20 Hz, the hammer 2 hardly follows the key 1*b*/1*c*, and any tone is not produced. The threshold is dependent on the mechanical properties of the acoustic piano so that the manufacturer must determine the threshold through experiences. Moreover, the threshold is varied in dependent on the depth of keystroke. If the human player deeply moves the mistakenly depressed key 1*b*/1*c*, the threshold is relatively high. On the other hand, if the human player shallowly keeps the mistakenly depressed key, the threshold is relatively low. The piano controller 12*b* may take the key position into account so as to vary the threshold.

The subroutine program for automatic playing and subroutine program for electronic proof may run in parallel on the central processing unit. In this situation, a human player can finger a music tune with the accompaniment of the automatic playing system. The electronic proof system monitors the fingering of human player, and gives the notice of incorrect fingering to the human player.

The subroutine program for electronic proof may be offered to users in the form of an information storage medium.

The black keys 1*b* and white keys 1*c* do not set any limit to the technical scope of the present invention. Pedal sensors, which monitor a damper pedal, a soft pedal and a sostenuto pedal of the acoustic piano 1/1B/1C/1D, supplies pedal position signals to the controller 11 so as to compare the timing at which the pedal is actually depressed with the target timing at which the pedal is to be depressed.

The component parts and jobs of the above-described embodiments are correlated with claim languages as follows.

The black keys 1*b*/130B and white keys 1*c*/130W are corresponding to "plural manipulators", and the pitch of tones is an "attribute of tones". The action units 3, hammers 2, strings 4 and dampers 6 as a whole constitute a tone generator. The key sensors 26/26E form in combination a "sensor unit", and the solenoid-operated key actuators 5 or light emitting elements 51/52 serve as "plural messengers". The notice of incorrect fingering is corresponding to "a notice of mistakenly depressed manipulators". The pitch of tones is equivalent to an "attribute of tones", and the event time is also equivalent to an "attribute of tones". The key position signal S3 is corresponding to a "detecting signal", and the driving signal S1 serve as a "driving signal".

The notice of incorrect fingering at step S14 is corresponding to a "notice of untimely depressed manipulator". The solenoid-operated key actuators 5 serve as "plural actuators". The information disc CD serves as an "information storage medium".

What is claimed is:

1. A musical instrument for producing tones, comprising:
   plural manipulators selectively depressed by a human player for specifying an attribute of said tones in a performance of a music tune;
   a tone generator connected to said plural manipulators, and producing said tones having the specified attribute;
   a sensor unit provided in association with said plural manipulators, and producing a detecting signal representative of the depressed manipulators;
   plural messengers having plural actuators respectively associated with said plural manipulators, said plural actuators independently moving the associated manipulators for bringing said human player a notice of mistakenly depressed manipulator through a tactile impression of said human player in said performance; and
   a controller connected to said sensor unit and said plural actuators of said plural messengers, supplied with pieces of music data expressing at least said attribute of tones to be produced in said performance of said music tune, and comparing said attribute of tones expressed by said pieces of music data with said attribute of tones specified by said depressed manipulators in said performance to see whether or not said human player correctly depresses said manipulators in said performance of said music tune so as to make said messengers associated with said mistakenly depressed manipulators bring said human player said notice of mistakenly depressed manipulator through the associated actuators when the comparison results in inconsistence.

2. The musical instrument as set forth in claim 1, in which said controller further makes the messengers bring a notice of prompt correction in said performance so as to inform said human player of the manipulators to be depressed for producing the tones expressed by said pieces of music data.

3. The musical instrument as set forth in claim 2, in which said messengers give rise to movements of said manipulators different from movements of said manipulators for said notice of mistakenly depressed manipulator so as to bring said notice of prompt correction through said tactile impression of said human player.

4. The musical instrument as set forth in claim 1, in which said controller makes said messengers bring said notice of mistakenly depressed manipulator after said human player releases said mistakenly depressed manipulators in said performance.

5. The musical instrument as set forth in claim 1, in which said pieces of music data further express target timing at which each of said manipulators is to be depressed in said performance, wherein said controller further makes said messengers bring said human player a notice of untimely depressed manipulator in said performance when said human player depresses the manipulator at actual timing different from said target timing by more than a certain time period regardless of whether or not the depressed manipulator specifies said attribute consistent with said attribute expressed by said pieces of music data.

6. The musical instrument as set forth in claim 5, in which said notice of untimely depressed manipulator is given to said human player through said tactile impression.

7. The musical instrument as set forth in claim 1, further comprising an automatic playing system selectively driving said plural manipulators without any manipulation of said human player for automatically performing a music tune on the basis of a set of pieces of music data.

8. The musical instrument as set forth in claim 7, in which said automatic playing system includes
plural actuators respectively associated with said plural manipulators and responsive to a driving signal so as to depress and release the manipulators, and
another controller connected to said plural actuators and processing said set of pieces of music data for selectively supplying said driving signal to said plural actuators.

9. The musical instrument as set forth in claim 8, in which said plural actuators of said automatic playing system further serve as said plural actuators of said plural messengers.

10. The musical instrument as set forth in claim 8, in which an information processing system is shared between said controller and said another controller.

11. An electric system for an electronic proof on a performance of a music tune on a musical instrument, comprising:
a sensor unit provided in association with plural manipulators of said musical instrument, and producing a detecting signal representative of depressed manipulators;
plural messengers having plural actuators respectively associated with said plural manipulators, and bringing a human player a notice of mistakenly depressed manipulator in said performance through a tactile impression of said human player; and
a controller connected to said sensor unit and said plural actuators of said plural messengers, supplied with pieces of music data expressing at least said attribute of tones to be produced in said performance of said music tune, and comparing said attribute of tones expressed by said pieces of music data with said attribute of tones specified by said depressed manipulators in said performance to see whether or not said human player correctly depresses said manipulators in said performance of said music tune so as to make the messengers associated with said mistakenly depressed manipulators bring said human player said notice of mistakenly depressed manipulator through the associated actuators when the comparison results in inconsistence.

12. The electric system as set forth in claim 11, in which said controller further makes the messengers bring a notice of prompt correction in said performance so as to inform said human player of the manipulators to be depressed for producing the tones expressed by said pieces of music data.

13. The electric system as set forth in claim 12, in which said messengers give rise to movements of said manipulators different from movements of said manipulators for said notice of mistakenly depressed manipulator so as to brings said notice of prompt correction through said tactile impression of said human player.

14. The electric system as set forth in claim 11, in which said controller makes said messengers bring said notice of mistakenly depressed manipulator after said human player releases said mistakenly depressed manipulators in said performance.

15. The electric system as set forth in claim 11, in which said pieces of music data further express target timing at which each of said manipulators is to be depressed in said performance, wherein said controller further makes said messengers bring said human player a notice of untimely depressed manipulator in said performance when said human player depresses the manipulator at actual timing different from said target timing by more than a certain time period regardless of whether or not the depressed manipulator specifies said attribute consistent with said attribute expressed by said pieces of music data.

16. The electric system as set forth in claim 15, in which said notice of untimely depressed manipulator is given to said human player through said tactile impression.

17. An information storage medium for storing a computer program expressing a method for an electronic proof, wherein said method comprising the steps of
a) determining a manipulator of a musical instrument depressed by a human player in a performance of a music tune,
b) comparing an attribute of tone specified by the depressed manipulator with said attribute of tone expressed by a piece of music data in said performance to see whether or not said human player correctly depresses the manipulator,
c) producing a notice of mistakenly depressed manipulator in said performance when the comparison at said step c) results in a negative answer,
d) bringing said human player said notice of mistakenly depressed manipulator in said performance by means of an actuator of a messenger associated with said mistakenly depressed key through a tactile impression of said human player,
e) prohibiting said messenger from brining said human player said notice without execution at said steps d) and e) when the comparison results in a positive answer, and
f) repeating said steps a) to e) in said performance for other tones in said music tune.

* * * * *